(12) United States Patent
Wicker

(10) Patent No.: US 9,813,233 B2
(45) Date of Patent: Nov. 7, 2017

(54) PRIVATE OVERLAY FOR INFORMATION NETWORKS

(75) Inventor: Stephen B. Wicker, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 13/641,030

(22) PCT Filed: Apr. 12, 2011

(86) PCT No.: PCT/US2011/032118
§ 371 (c)(1),
(2), (4) Date: Jan. 2, 2013

(87) PCT Pub. No.: WO2011/130274
PCT Pub. Date: Oct. 20, 2011

(65) Prior Publication Data
US 2013/0101117 A1    Apr. 25, 2013

Related U.S. Application Data

(60) Provisional application No. 61/323,713, filed on Apr. 13, 2010.

(51) Int. Cl.
*H04L 29/06* (2006.01)
*H04L 9/00* (2006.01)
(Continued)

(52) U.S. Cl.
CPC ........... *H04L 9/006* (2013.01); *H04L 9/3218* (2013.01); *H04L 9/3263* (2013.01); *H04W 8/16* (2013.01);
(Continued)

(58) Field of Classification Search
CPC ..... H04L 63/08; H04L 63/0876; H04L 63/10; G06F 21/00
See application file for complete search history.

(56) References Cited

U.S. PATENT DOCUMENTS 6,463,534 B1 * 10/2002 Geiger et al. .................. 713/168
7,139,556 B2 * 11/2006 Marley ............... H04L 63/0421
                                                            455/403
(Continued)

FOREIGN PATENT DOCUMENTS

CN    101242527 A    8/2008
CN    101542494 A    9/2009
(Continued)

OTHER PUBLICATIONS

GSM, Digital cellular telecommunications system (Phase 2+); General Packet Radio Service (GPRS); Service description; Stage 2 (GSM 03.60 version 6.3.2 Release 1997), 107 Pages.*
(Continued)

*Primary Examiner* — Farid Homayounmehr
*Assistant Examiner* — Christopher C Harris
(74) *Attorney, Agent, or Firm* — Harris Beach PLLC

(57) ABSTRACT

A private overlay is provided for information networking that puts the user in charge of the user's personal information. User identity is separated from a numeric tag that points to the cell in which the user equipment can be paged. The private overlay is created by addition of a registration and certification authority such as Public Key Infrastructure and Certification Authority (PKI). The registration and certification authority provides the network and all subscribers with public encryption keys for the network and the users. Private decryption key are generated and stored locally in a suitable manner. With this addition, a private overlay to the existing cellular, wireless or utility distribution infrastructure can be established for a device that has registered with, e.g., a cellular or wireless network or with a utility distribution system.

26 Claims, 10 Drawing Sheets

Figure 1:
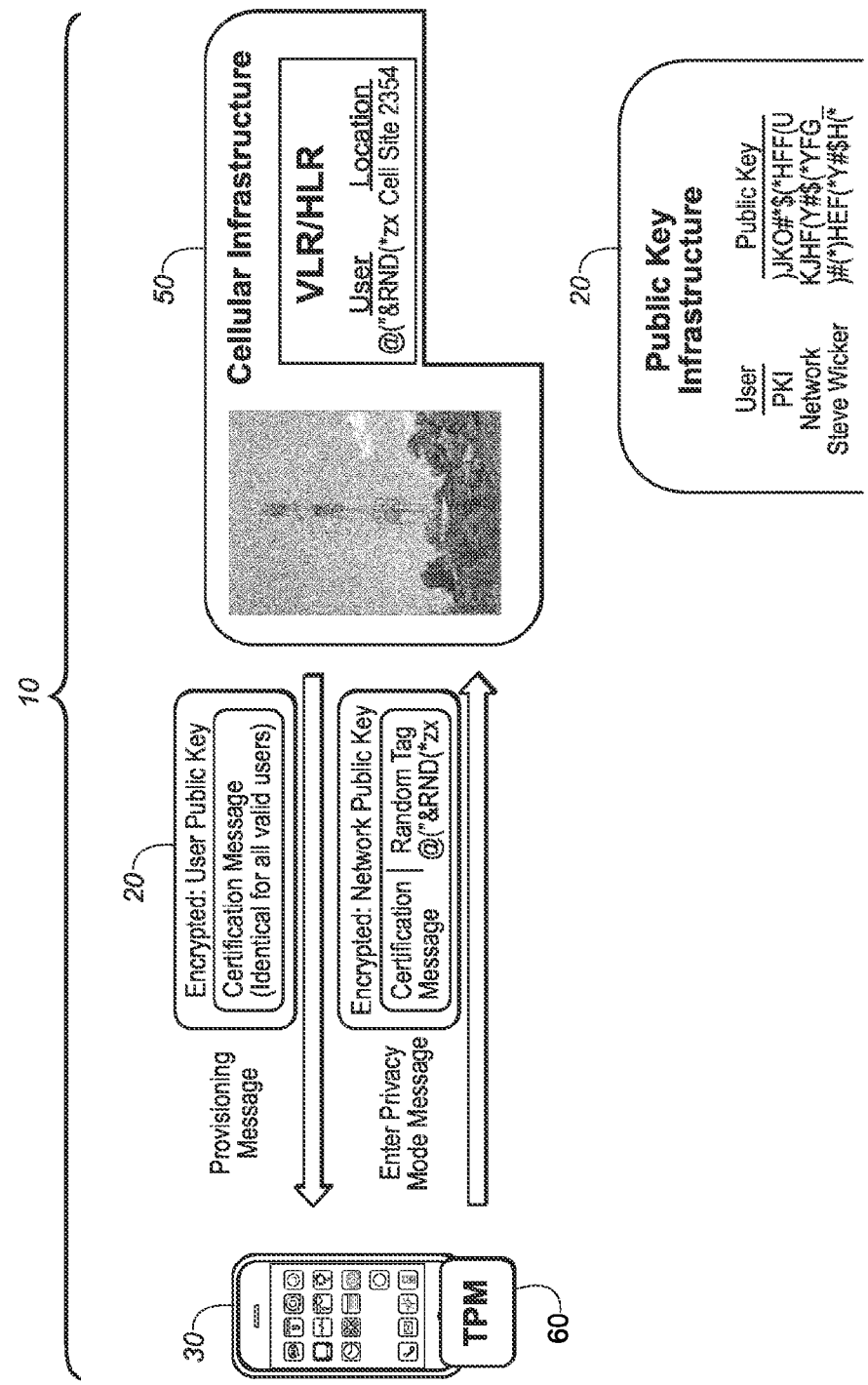

(51) Int. Cl.
*H04W 8/16* (2009.01)
*H04L 9/32* (2006.01)
*H04W 12/02* (2009.01)
*H04W 12/04* (2009.01)

(52) U.S. Cl.
CPC ........ *H04L 63/04* (2013.01); *H04L 2209/127* (2013.01); *H04L 2209/42* (2013.01); *H04L 2209/80* (2013.01); *H04W 12/02* (2013.01); *H04W 12/04* (2013.01)

(56) References Cited

U.S. PATENT DOCUMENTS

| | | | | |
|---|---|---|---|---|
| 7,245,602 | B2* | 7/2007 | Skubic | H04L 29/12254 370/328 |
| 7,747,024 | B2 | 6/2010 | Challener | |
| 7,992,194 | B2* | 8/2011 | Damodaran et al. | 726/4 |
| 8,161,285 | B2* | 4/2012 | Ellison | G06F 21/57 713/164 |
| 2003/0072450 | A1* | 4/2003 | Maggenti | H04L 63/0442 380/270 |
| 2004/0124966 | A1* | 7/2004 | Forrest | 340/5.8 |
| 2004/0199914 | A1* | 10/2004 | Aerrabotu | H04L 29/12009 718/100 |
| 2007/0073416 | A1* | 3/2007 | Grawrock | 700/1 |
| 2008/0052518 | A1 | 2/2008 | Newton et al. | |
| 2008/0052772 | A1* | 2/2008 | Conrado | G06F 21/6254 726/10 |
| 2008/0072289 | A1* | 3/2008 | Aoki et al. | 726/3 |
| 2008/0077801 | A1 | 3/2008 | Ekberg | |
| 2008/0182592 | A1 | 7/2008 | Cha et al. | |
| 2008/0192937 | A1 | 8/2008 | Challener | |
| 2008/0270790 | A1* | 10/2008 | Brickell et al. | 713/158 |
| 2008/0320308 | A1* | 12/2008 | Kostiainen et al. | 713/171 |
| 2009/0129600 | A1* | 5/2009 | Brickell et al. | 380/282 |
| 2009/0158032 | A1* | 6/2009 | Costa et al. | 713/156 |
| 2009/0193249 | A1* | 7/2009 | Conrado | H04L 63/0421 713/156 |
| 2010/0082984 | A1* | 4/2010 | Ellison | G06F 21/57 713/170 |
| 2011/0131406 | A1* | 6/2011 | Jones et al. | 713/150 |
| 2011/0154501 | A1* | 6/2011 | Banginwar et al. | 726/26 |

FOREIGN PATENT DOCUMENTS

| | | | |
|---|---|---|---|
| CN | 101589596 A | 11/2009 | |
| EP | 0982958 A2 * | 3/2000 | ......... H04L 63/0414 |
| WO | WO-2008038196 A2 | 4/2008 | |
| WO | WO-2008094452 A2 | 8/2008 | |

OTHER PUBLICATIONS

International Search Report and Written Opinion of the International Searching Authority for International Application No. PCT/US11/32118 mailed Nov. 21, 2011 (9 pages).

The State Intellectual Property Office of the People's Republic of China, First Office Action mailed Oct. 10, 2014 for Chinese Patent Application No. 201180027910.3 (19 pages).

Microsoft Developer Resources (undated). Public Key Infrastructure, https://msdn.microsoft.com/en-us/library/windows/desktop/bb427432(v=vs.85).aspx, (3 pgs).

SAP ZB01, "Maintain Certification Message Table", 2002, Massachusetts Institute of Technology (pp. 1-5).

Mont, Marco Casassa, et al., "A Flexible Role-based Secure Messaging Service: Exploiting IBE Technology in a Health Care Trial", 2003, HPL-2003-21, Hewlett-Packard Company (17 pgs).

Lee et al. (2002). Self-certified Signatures. In A. Menezes et al. (eds). Progress in Cryptology—INDOCRYPT 2002. Springer-Verlag Berlin Heidelberg 2002. (pp. 199-214).

Shoup, Victor, On Fast and Provably Secure Message Authentication Based on Universal Hashing, 1996, Advances in Cryptology—CRYPTO '96, (p. 316).

\* cited by examiner

| TPM Misc. Services | Cryptographic Commands | TPM_Sign<br>TPM_GetRandom<br>TPM_StirRandom | These commands provide general purpose cryptographic services. |
|---|---|---|---|
| | Auditing Commands | TPM_GetAuditEvent<br>TPM_GetAuditEventSigned<br>TPM_SetOrdinalAuditStatus<br>TPM_GetOrdinalAuditStatus | These commands are used to collect audit trail data and control auditing features. |
| | Capability Reporting Commands | TPM_GetCapability<br>TPM_GetCapabilitySigned<br>TPM_GetCapabilityOwner | These commands provide information about the TPM part and implemented functionality. |

*FIG. 2*

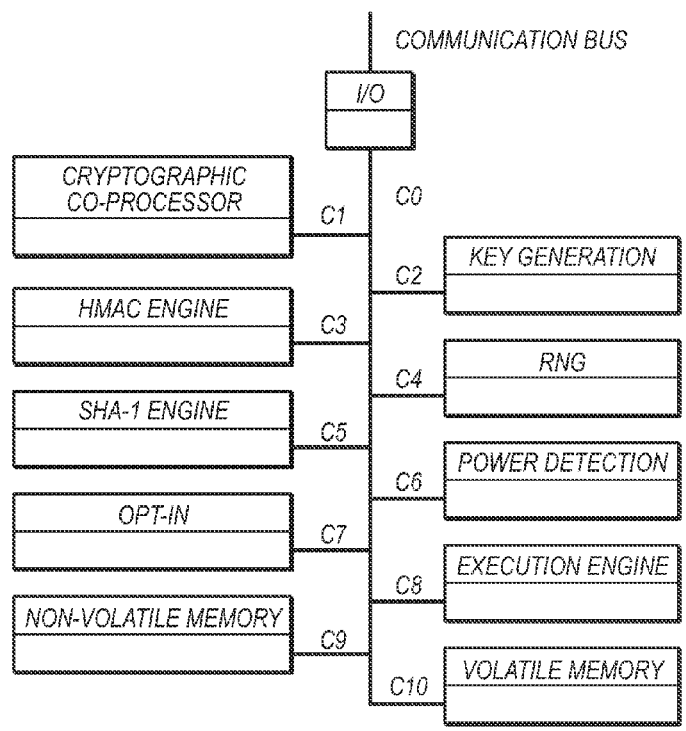

*FIG. 3*

| ASSUMPTION | BUSINESS-AS-USUAL | EXPANDED BAU | ACHIEVABLE PARTICIPATION | FULL PARTICIPATION |
|---|---|---|---|---|
| AMI DEPLOYMENT | PARTIAL DEPLOYMENT | PARTIAL DEPLOYMENT | FULL DEPLOYMENT | FULL DEPLOYMENT |
| DYNAMIC PRICING PARTICIPATION (OF ELIGIBLE) | TODAY'S LEVEL | VOLUNTARY (OPT-IN); 5% | DEFAULT (OPT-OUT); 60% TO 75% | UNIVERSAL (MANDATORY); 100% |
| ELIGIBLE CUSTOMERS OFFERED ENABLING TECH | NONE | NONE | 95% | 100% |
| ELIGIBLE CUSTOMERS ACCEPTING ENABLING TECH | NONE | NONE | 60% | 100% |
| BASIS FOR NON-PRICING PARTICIPATION RATE | TODAY'S LEVEL | "BEST PRACTICES" ESTIMATE | "BEST PRACTICES" ESTIMATE | "BEST PRACTICES" ESTIMATE |

*FIG. 6*

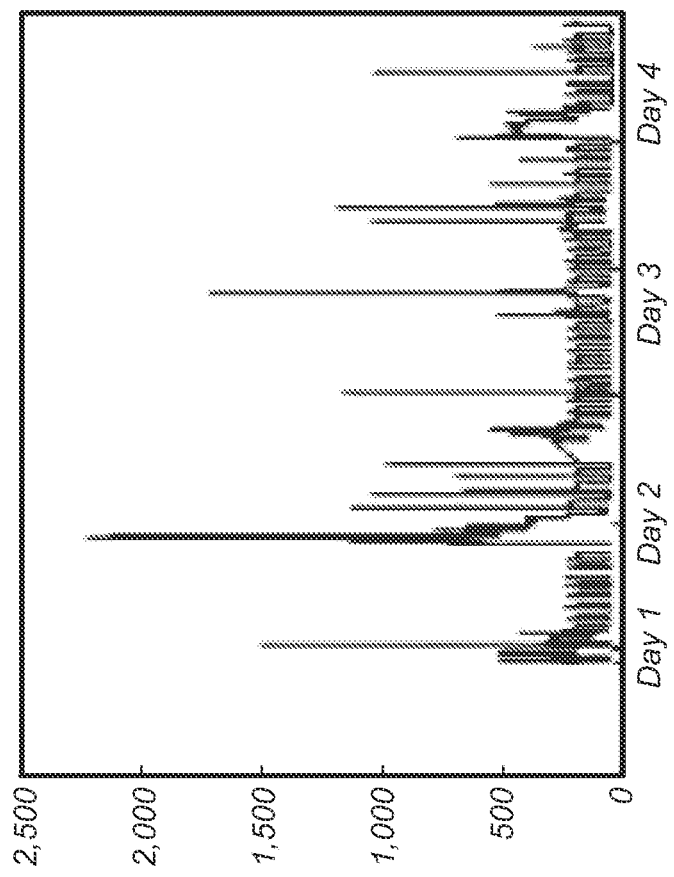

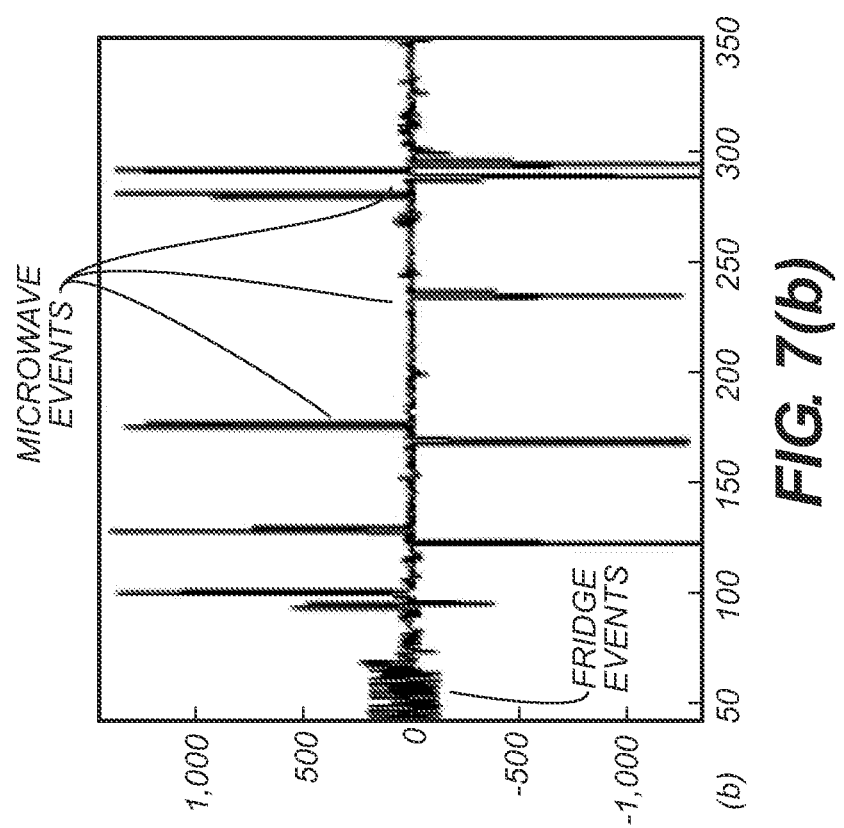

PRIVATE OVERLAY FOR INFORMATION NETWORKS

CROSS-REFERENCE TO RELATED APPLICATIONS

This application is a national stage application under 35 U.S.C. §371 of PCT Application No. PCT/US2011/032118, filed Apr. 12, 2011, which claims priority to and the benefit of U.S. provisional patent application Ser. No. 61/323,713, entitled Private Overlay for Cellular Networks, filed Apr. 13, 2010, which is incorporated herein by reference in its entirety.

STATEMENT REGARDING FEDERALLY SPONSORED RESEARCH OR DEVELOPMENT

This invention was made with government support under grant number 0424422 awarded by the National Science Foundation. The government has certain rights in the invention.

1. TECHNICAL FIELD

The present invention relates to systems and methods for protecting privacy of a user of a platform in an information network. The invention also relates to private (or privacy) overlays for users of cellular, wireless or third-party data reception and management systems.

2. BACKGROUND OF THE INVENTION

Public Key Cryptography

Public key cryptography allows for two distinct keys, one for encryption and the other for decryption. Any piece of plaintext that is encrypted using the encryption key can only be decrypted if one has the decryption key. If properly designed, it is not possible to obtain one key from the other without solving a very hard mathematical problem. One can thus make the encryption key public, perhaps by posting it online, so that anyone can encrypt a message and send it to the intended user without fear of the message being readable by anyone who does not have the secret decryption key. The message will remain secure so long as the decryption key is kept secret. Diffie and Hellman introduced public key cryptography in 1976. The next significant step was taken in the late 1970s by Rivest, Shamir, and Adleman with their invention of the RSA cryptosystem (the acronym contains the first letter of each of the inventors' last names). The RSA cryptosystem implements public key cryptography with an algorithm known in the art (the implementation relies primarily on exponentiation modulo a large number). The security of the RSA cryptosystem is presumed to be based on the difficulty of factoring very large numbers of the form A×B, where A and B are large prime numbers. It has never been conclusively proven, but it is generally believed that the only way to obtain a well-selected RSA decryption key from the corresponding encryption key (or vice versa) is to factor the product of two large primes. This is a well-understood problem that is known to be very difficult. RSA keys are much larger than symmetric system keys, but not so much as to be unworkable. 3072-bit RSA keys are generally felt in the art to provide the same level of security as 128-bit keys in symmetric key systems (See, e.g., http://csrc.nist-.gov/publications/nistpubs/800-57/sp800-57-Part1-revised2_Mar08-2007.pdf). Another remarkable aspect of having two distinct keys is that the system can be used to generate secure digital signatures as well as providing secure communication.

Public key cryptography has a strong role to play in trusted communication. But one piece is still missing: we want to be sure that when we use a public key to send, e.g., our credit card information to e.g., an on-line seller, it really is that on-line seller that provided the key.

A solution to this problem that is known in the art takes the form of a public key certificate. A public key certificate binds a public key to an individual or corporate identity in much the same way that a passport binds information about an individual (name, date of birth, place of birth, etc.) to a passport photograph Currently, E-commerce retailers go to a registration authority and present sufficient documentation to prove their corporate identities. Once their identities have been verified, an associated certification authority generates the public key and places it on the certificate, binding it to information about the entity associated with the key. The certification authority will digitally sign the certificate so that it can be verified by the certified entity's customers. The registration and certification authorities and other, related functionality is often found under the head of a single entity called the public key infrastructure (PKI). Several large companies, such as VeriSign, have emerged as dominant PKIs for Internet commerce. They establish trust through a variety of means, including their reliability, cash warrantees as high as $250,000 (see http://www.verisign.com/ssl/buy-ssl-certifi-cates/index.html?tid=a_box), and the fact that their value as a corporation would vanish overnight if they abused the trust placed in them. Many web browsers are configured to automatically accept certificates from known PKIs, thus freeing the human user from having to worry about such things.

For example, suppose a buyer wishes to go to an on-line bookseller's website to buy several copies of a book. The buyer would first enter the bookseller's URL into the URL line at the top of his browser and make his way to the bookseller's home page. The buyer would then place copies of the book into a virtual shopping cart and proceed to checkout. It is at this point that the cryptographic action begins, unbeknownst to most users. The seller will send the buyer's browser a certificate containing a public encryption key. If the buyer wishes, he can actually view the certificate by clicking on the displayed lock icon that indicates secure browsing in some browsers. These certificates contain a lot of information, including the signing authority, the public encryption key, and the intended encryption algorithm. For this example, the certificate is signed by an authentication service, e.g., VeriSign, and calls for RSA encryption with a certain length key, say 2040 bits. Having verified the certificate, the buyer's browser will generate a 128 or 256-bit key for a symmetric key cryptosystem. This key will be encrypted using the RSA public encryption key provided on the certificate, and the resulting cryptogram will be sent to the online seller. The seller and buyer now share a secret symmetric key, and they can now converse securely. The success of e-commerce rests on the trust generated through the security of public key cryptography and trusted third parties, e.g., authentication services such as VeriSign.

Protecting Privacy in Information Networks

From its inception, landline telephony has been a surveillance technology. The prospects for surveillance increased with cellular telephony, as registration messages provide a constant stream of location information. More recently the impact of surveillance has become increasingly important as non-telephonic computational and video functionality have converged onto the cellular platform and as usage of wireless platforms and wireless networks has expanded.

There is a need in the art for a system for protecting privacy in information networks, such as cellular and wireless networks, that puts the user in charge of his or her personal information.

Citation or identification of any reference in Section 2, or in any other section of this application, shall not be considered an admission that such reference is available as prior art to the present invention.

3. SUMMARY OF THE INVENTION

A system is provided for protecting privacy of a user of a platform in a network, the system comprising:
a private overlay 10, the private overlay comprising a system for distributing certified public keys in a public key cryptosystem 20;
wherein:
the platform 40 is comprised in user equipment 30, and
the system for distributing certified public keys provides the network 50 and each authorized user of the network with a public encryption key for the network and each authorized user.

In one embodiment of the system, the user equipment is a cellular or mobile telephone, a computer or a customer data collection system, a utility meter, or a wired terminal.

In another embodiment of the system, the customer data collection system is a utility meter.

In another embodiment of the system, the system for distributing certified public keys is Public Key Infrastructure and Certification Authority (PKI).

In another embodiment of the system, the platform is a cellular platform and the network is a cellular network, the platform is a wireless platform and the network is a wireless network, or the platform is a utility platform or third party data reception and management platform and the network is a communications network that communicates with a customer data collection unit.

In another embodiment of the system, the customer data collection unit is an electric meter, gas meter or utility meter.

In another embodiment of the system, a private decryption key is generated and stored locally.

In another embodiment of the system, the platform is a cellular platform, the network is a cellular network, and the cellular network associates the user equipment with a random number, thereby separating the user equipment from user identity.

In another embodiment of the system, the platform is a wireless platform, the network is a wireless network, and the wireless network associates the user equipment with a random number, as opposed to a user account identifier, thereby separating the user equipment from user identity.

In another embodiment of the system, the platform is a utility or third party data reception and management platform, the network is a communications network, and the communications network associates the user equipment with a random number, thereby separating the user equipment from user identity.

In another embodiment, the system comprises a cryptographic chip 60, wherein the platform comprises the cryptographic chip and wherein the cryptographic chip is programmed to keep a certification message in a cryptographically secure vault.

In another embodiment of the system, the cryptographic chip is Trusted Platform Module (TPM).

In another embodiment of the system, the platform is cellular and the cryptographic chip is programmed to keep track of call minutes while the user equipment is in cellular mode.

In another embodiment of the system, call minutes are prepaid.

In another embodiment of the system, the platform is wireless and the cryptographic chip is programmed to keep track of wireless usage minutes while the user equipment is in wireless mode.

In another embodiment of the system, wireless usage minutes are prepaid.

In another embodiment of the system, the cryptographic chip is programmed to support remote attestation, whereby the network remotely determines whether the user equipment is authorized.

In another embodiment of the system, the cryptographic chip is programmed to support remote attestation, whereby the network remotely determines whether or not the user equipment has been cloned.

In another embodiment of the system, the cryptographic chip is programmed to support remote attestation, whereby the network remotely determines whether user equipment hardware and/or software has been altered.

Also provided is a method for protecting privacy of a user of a platform in a network, the method comprising the step of:
providing a private overlay 10, the private overlay comprising a system for distributing certified public keys in a public key cryptosystem 20;
wherein:
the platform 40 is comprised in user equipment 30, and
the system for distributing certified public keys provides the network and each authorized user of the network with a public encryption key for the network and each authorized user.

In one embodiment of the method, the user equipment is a cellular or mobile telephone, a computer or a customer data collection system.

In another embodiment of the method, the customer data collection system is a utility meter.

In another embodiment of the method, the system for distributing certified public keys is Public Key Infrastructure and Certification Authority (PKI).

In another embodiment of the method, the platform is a cellular platform and the network is a cellular network, the platform is a wireless platform and the network is a wireless network, or the platform is a utility platform or third party data reception and management platform and the network is a communications network that communicates with a customer data collection unit.

In another embodiment of the method, the customer data collection unit is an electric meter, gas meter or utility meter.

In another embodiment of the method, a private decryption key is generated and stored locally.

In another embodiment of the method, the platform is a cellular platform and the network is a cellular network, and the method further comprises the step of the cellular network associating the user equipment with a random number, thereby separating the user equipment from user identity.

In another embodiment of the method, the platform is a wireless platform and the network is a wireless network, and the method further comprises the step of the wireless network associating the user equipment with a random number, thereby separating the user equipment from user identity.

In another embodiment of the method, the platform is a utility or third party data reception and management platform, the network is a communications network, and the communications network associates the user equipment with a random number, thereby separating the user equipment from user identity.

In another embodiment of the method, the private overlay comprises a cryptographic chip, wherein the platform comprises the cryptographic chip and wherein the cryptographic chip is programmed to keep a certification message in a cryptographically secure vault.

In another embodiment of the method, the cryptographic chip is Trusted Platform Module (TPM).

In another embodiment of the method, the platform is cellular and the cryptographic chip is programmed to keep track of call minutes while the user equipment is in cellular mode.

In another embodiment of the method, call minutes are prepaid.

In another embodiment of the method, the platform is wireless and the cryptographic chip is programmed to keep track of wireless usage minutes while the user equipment is in wireless mode.

In another embodiment of the method, wireless usage minutes are prepaid.

In another embodiment of the method, the cryptographic chip is programmed to support remote attestation, the method comprising the step of the network remotely determining whether the user equipment is authorized.

In another embodiment of the method, the cryptographic chip is programmed to support remote attestation, the method comprising the step of the network remotely determining whether or not the user equipment has been cloned.

In another embodiment of the method, the cryptographic chip is programmed to support remote attestation, the method comprising the step of the network remotely determining whether or not user equipment hardware and/or software have been altered.

In another embodiment, the method comprises the step of operating the platform in a private mode, wherein the network is unable to associate location data for the platform with a specific user when the platform operates in the private mode.

In another embodiment of the method, the step of operating the platform in a private mode comprises the step of:
performing private registration;
wherein private registration comprises the steps of:
the network periodically transmitting an identical certification message to each authorized user of the network; and
the network encrypting the certification message that is transmitted to each authorized user using that user's public encryption key.

In another embodiment of the method, the step of the network periodically transmitting the identical certification message is performed daily.

In another embodiment of the method, the step of operating the platform in private mode comprises the steps of:
the platform sending a Privacy Enabling Registration (PER) message to the network; and the platform encrypting the PER using the networks public encryption key, wherein the PER comprises the certification message and a Random Equipment Tag (RET).

In another embodiment of the method, the certification message in the PER acts as a zero-knowledge proof that shows the network that the PER was sent by a valid user, and does not identify the user.

In another embodiment of the method, the RET is a random number.

In another embodiment the method comprises the steps of entering the RET into a visitor location register (VLR) and the home location register (HLR) of the network; and treating the RET as a telephone number, account identifier, or user ID data transmission, whereby the VLR and the HLR collect information needed to establish and maintain a cellular telephone or data call, a wireless data connection or a data transmission to the platform, but do not associate the information with a particular user, telephone number, account identifier or user ID.

In another embodiment of the method, the cellular telephone or data call, the wireless data connection or data transmission is incoming or outgoing.

In another embodiment the method comprises the step of associating the RET with a temporary IP address.

In another embodiment of the method, the cellular telephone call is an incoming call, the method comprising the step of distributing the user's RET and identity of the service provider of the cellular network (e.g., network ID) to parties from whom the user is willing to receive a cellular telephone call, wherein the distributing step uses public key encryption.

In another embodiment of the method, the user performs the distributing step.

In another embodiment of the method, the system for distributing certified public keys performs the distributing step.

In another embodiment, the method comprises the step of building a cryptographic chip into the cellular platform, wherein the cryptographic chip is programmed to keep the certification message in a cryptographically secure vault.

In another embodiment of the method, the cryptographic chip is Trusted Platform Module (TPM).

In another embodiment of the method, the cryptographic chip is programmed to keep track of cellular telephone call minutes while the equipment is in cellular mode.

In another embodiment of the method, call minutes are prepaid.

In another embodiment of the method, the cryptographic chip is programmed to support remote attestation, the method comprising the step of the network remotely determining whether the equipment is authorized.

In another embodiment of the method, the cryptographic chip is programmed to support remote attestation, the method comprising the step of the network remotely determining whether the equipment has been cloned.

In another embodiment of the method, the TPM is programmed to support remote attestation, the method comprising the step of the network remotely determining whether the equipment hardware and/or software has been altered.

Also provided is a method for determining whether user equipment is authorized, wherein the user is a user of a platform in a network. In one embodiment, the method comprises the step of providing a private overlay, the private overlay comprising a system for distributing certified public keys in a public key cryptosystem;
wherein:
the platform is comprised in user equipment, and
the system for distributing certified public keys provides the network and each authorized user of the network with a public encryption key for the network and each authorized user.

Also provided is a method for determining whether user equipment has been cloned, wherein the user is a user of a platform in a network. In one embodiment, the method comprises the step of providing a private overlay, the private overlay comprising a system for distributing certified public keys in a public key cryptosystem;
wherein:
the platform is comprised in user equipment, and
the system for distributing certified public keys provides the network and each authorized user of the network with a public encryption key for the network and each authorized user.

Also provided is a method for determining whether user equipment hardware or software has been altered or tampered with, wherein the user is a user of a platform in a network. In one embodiment, the method comprises the step of providing a private overlay, the private overlay comprising a system for distributing certified public keys in a public key cryptosystem;
wherein:
the platform is comprised in user equipment, and
the system for distributing certified public keys provides the network and each authorized user of the network with a public encryption key for the network and each authorized user.

Also provided is a method for billing a user, wherein the user is a user of a platform in a network. In one embodiment, the method comprises the step of providing a private overlay, the private overlay comprising a system for distributing certified public keys in a public key cryptosystem;
wherein:
the platform is comprised in user equipment, and
the system for distributing certified public keys provides the network and each authorized user of the network with a public encryption key for the network and each authorized user.

In specific embodiments, the platform is a cellular platform and the network is a cellular network, the platform is a wireless platform and the network is a wireless network, or the platform is a utility platform or third party data reception and management platform and the network is a communications network that communicates with a customer data collection unit.

4. BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated or enlarged to facilitate an understanding of the invention.

FIG. 1. A schematic of one embodiment of a private (or privacy) overlay 10 for a cellular system. The private overlay 10 uses the infrastructure of an existing communications, information or data network (e.g., a cellular network) 50 to provide services (e.g., cellular voice and data services) without creating a location and usage record tied to the user. At the lower right is a detail of the infrastructure for a system for distributing certified public keys in a public key cryptosystem 20. In this embodiment, the system for distributing certified public keys is Public Key Infrastructure and Certification Authority (PKI). TPM, Trusted Platform Module or cryptographic chip 60. VLR, visitor location register. HLR, home location register. User random tag, @(*&RND(*zx.

FIG. 2. A table modified after Trusted Platform Module (TPM) Miscellaneous Services; Trusted Computing Group (TCG) Specification Architecture Overview, Revision 1.4, pg. 36. See Section 5.3 for details.

FIG. 3. A diagram modified after TPM Component Architecture, TPM Main Part 1. See Section 5.3 for details.

Figure 4:
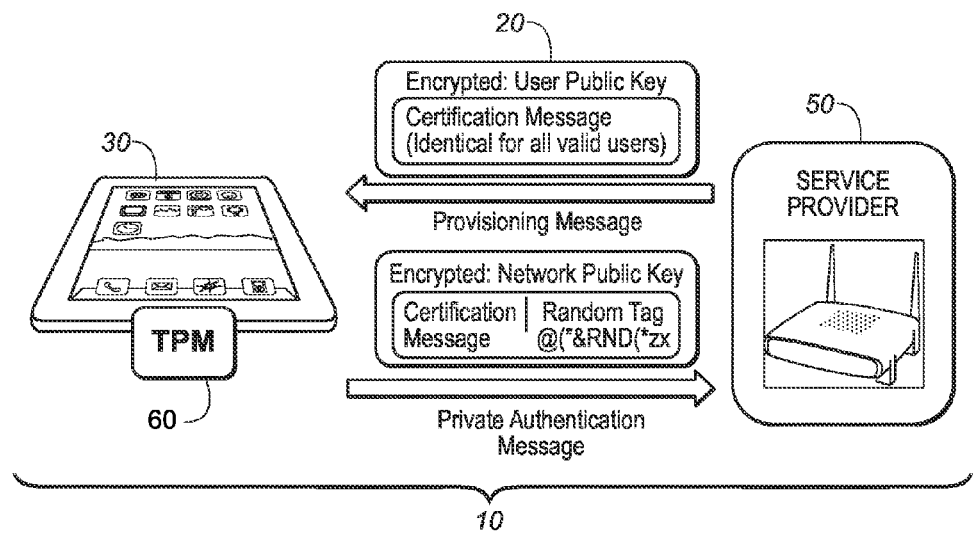

FIG. 4. A schematic of one embodiment of a private overlay for a cellular or wireless system. Service provider can be, for example, a cellular or wireless service provider. TPM, Trusted Platform Module or cryptographic chip 60.

Figure 5:
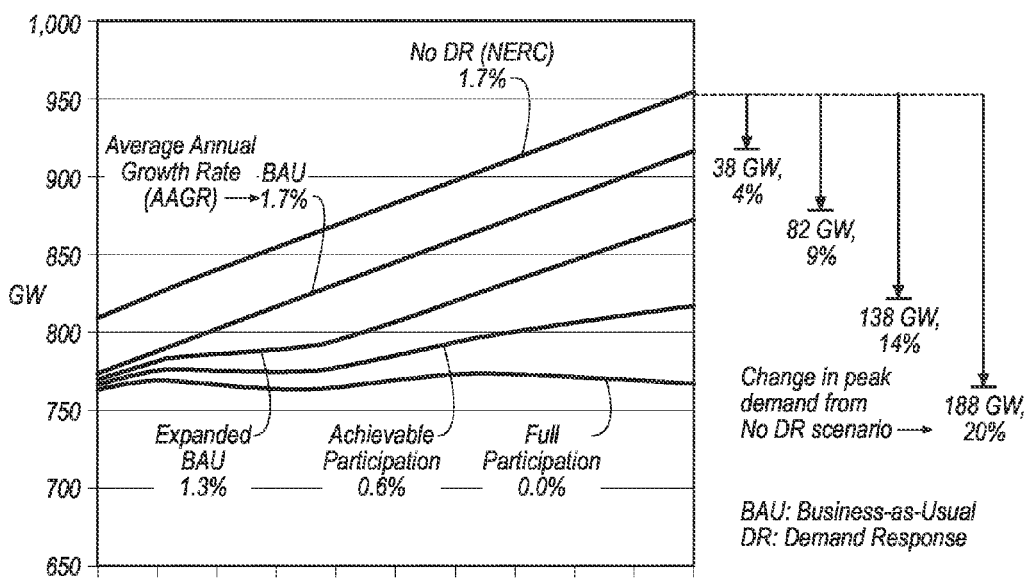

FIG. 5. Assessment of the potential for demand response. Modified after Federal Energy Regulatory Commission (2009, June). A National assessment of demand response potential, Staff Rep., http://www.ferc.gov/legal/staff-reports/06-09-demand-response.pdf). See Section 6.3 for details.

FIG. 6. Key differences in scenario assumptions. Modified after Federal Energy Regulatory Commission (2009, June). A National assessment of demand response potential, Staff Rep., http://www.ferc.gov/legal/staff-reports/06-09-demand-response.pdf). See Section 6.3 for details.

FIGS. 7a-d. Behavior-extraction algorithm. (a) the aggregate power-consumption data, (b) the derived switch events, (c) several identified load events, and (d) a comparison between reference and estimated intervals. Modified after M. Lisovich, D. Mulligan, and S. B. Wicker, Inferring personal information from demand-response systems, IEEE Security Privacy Mag., vol. 8, no. 1, pp. 11-20, January/February 2010.5ee Section 6.3 for details.

Figure 8:
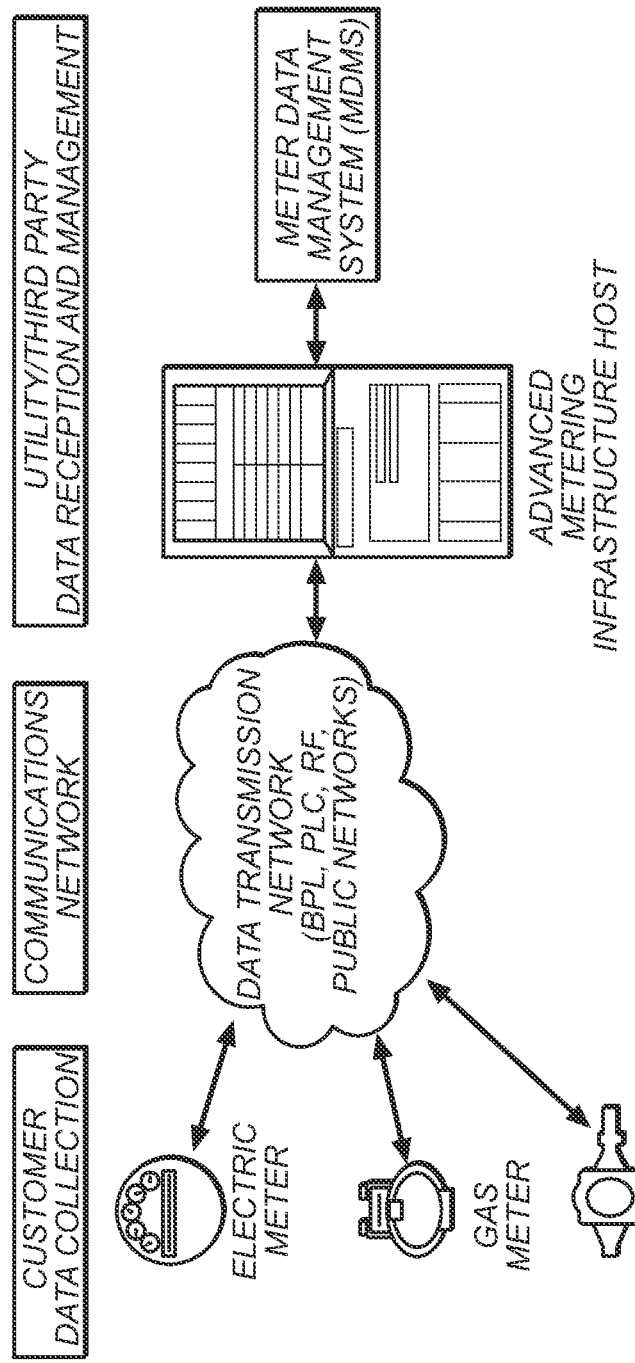

FIG. 8. Advanced Metering Infrastructure (AMI) building blocks. Modified after Engineering Power Research Institute, Advanced Metering Infrastructure, http://www.ferc.gov/eventcalendar/Files/20070423091846-EPRI%20-%20Advanced%20Metering.pdf). See Section 6.3 for details.

Figure 9:
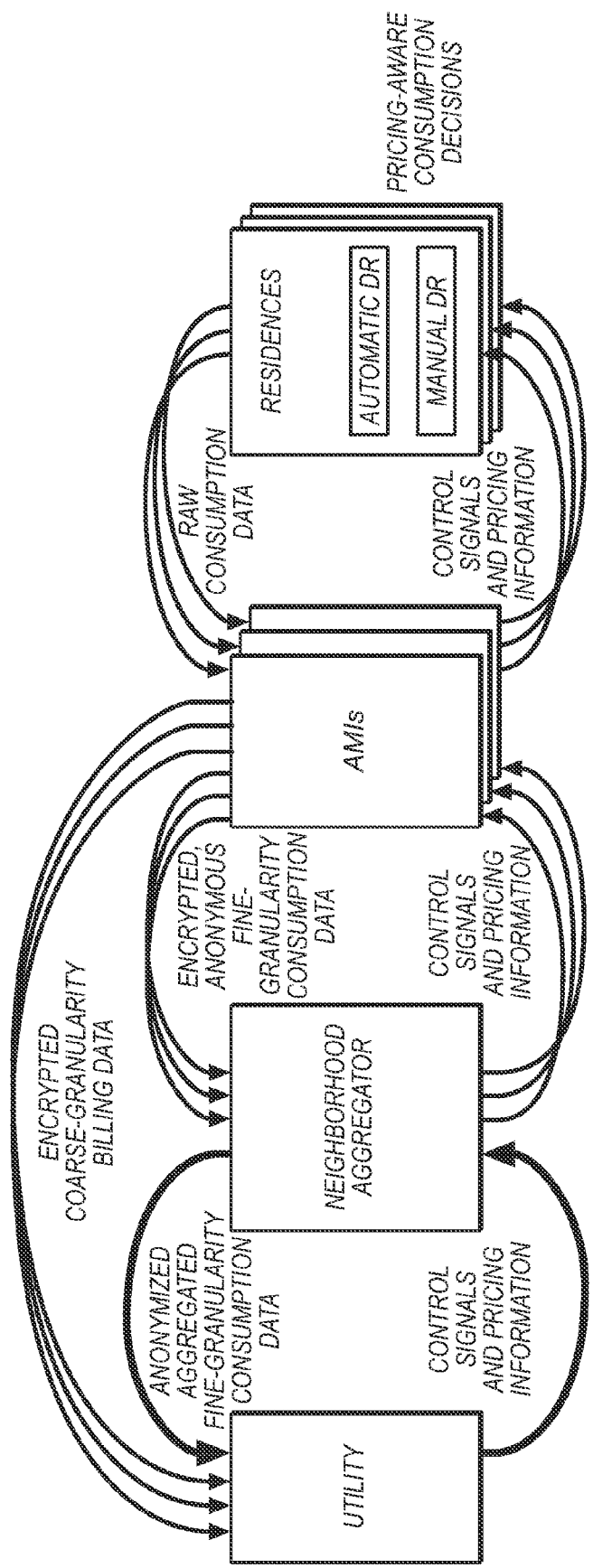

FIG. 9. Privacy-aware demand response architecture. See Section 6.3 for details.

5. DETAILED DESCRIPTION OF THE INVENTION

A private overlay 10 is provided for information networks or networking systems (e.g., cellular telephone network, wireless computer network, wired computer network, communications network, third party data reception and management system, or utility distribution system), that puts the user in charge of his or her personal information. The identity of the user is separated from a numeric tag that points to the cell in which the user equipment 30 can be paged. The private overlay 10 is created by addition of a Public Key Infrastructure and Certification Authority (PKI) or other registration and certification authority 20. Such registration and certification authorities are known in the art. The PKI (or other registration and certification authority) 20 provides the cellular telephone, wireless computing, or utility distribution system or network and all of its subscribers with public encryption keys for the network and the users. Private decryption keys are generated and stored locally in a suitable manner. Such methods for private decryption key generation and storage are known in the art. With this addition, a private overlay 10 to the existing cellular, wireless, third party data reception and management, or utility distribution infrastructure 50 can be established for a device that has registered with a cellular or wireless network or with a utility or third party data reception and management system.

For clarity of disclosure, and not by way of limitation, the detailed description of the invention is divided into the subsections set forth below.

5.1. System for Protecting Privacy of a User

A system for protecting privacy of a user of a platform 40 in a network is provided. The system comprises:

a private overlay 10, the private overlay 10 comprising a system for distributing certified public keys in a public key cryptosystem 20;

wherein:

the platform 40 is comprised in user equipment 30, and the system for distributing certified public keys 20 provides the network and each authorized user of the network with a public encryption key for the network and each authorized user.

In one embodiment, the user equipment 30 is a cellular telephone, a computer or a customer data collection unit. Any customer data collection unit known in the art can be employed. For example, in one embodiment, the customer data collection unit is for utility management or distribution, such as a utility meter, e.g., an electric meter, gas meter or water meter.

In a specific embodiment, the private overlay 10 can be for a 3G and 4G cellular system.

In another embodiment, the platform 40 is a cellular platform and the network is a cellular network (FIGS. 1 and 4). In another embodiment, the platform is a wireless platform and the network is a wireless network (FIG. 4). In another embodiment, the platform is a customer data collection platform and the network is a communications network (FIG. 8).

In another embodiment, the system for distributing certified public keys 20 is a Public Key Infrastructure and Certification Authority (PKI) or other registration and certification authority known in the art.

In another embodiment, a private decryption key is generated and stored locally.

In another embodiment, a cellular network 50 associates the user equipment (e.g., cellular or mobile telephone) with a random number, as opposed to a telephone number, thereby separating the user equipment from user identity (FIG. 1).

In another embodiment, the platform 40 is a wireless platform, the network 50 is a wireless network, and the wireless network associates the user equipment 30 with a random number, as opposed to a user account identifier, thereby separating the user equipment from user identity (FIG. 4).

In another embodiment, the platform 40 is a utility or third party data reception and management platform, the network 50 is a communications network, and the communications network associates the user equipment 30 (e.g., an electric meter, gas meter or water meter) with a random number, thereby separating the user equipment 30 from user identity.

In another embodiment, the system comprises a cryptographic chip 60, wherein the cryptographic chip is built into the platform 40 and programmed to keep a certification message in a cryptographically secure vault.

In another embodiment, the cryptographic chip 60 is a Trusted Platform Module (TPM).

In another embodiment, the platform 40 is cellular and the cryptographic chip 60 is programmed to keep track of call minutes while the user equipment is in cellular mode.

In another embodiment, the cellular telephone call minutes are prepaid.

In another embodiment, the platform 40 is wireless and the cryptographic chip 60 is programmed to keep track of wireless usage minutes while the user equipment is in wireless mode.

In another embodiment, the wireless usage minutes are prepaid.

In another embodiment, the cryptographic chip 60 is programmed to support remote attestation, whereby the network 50 remotely determines whether the user equipment 30 is authorized.

In another embodiment, the cryptographic chip is programmed to support remote attestation, whereby the network remotely determines whether or not the user equipment has been cloned or otherwise tampered with.

In another embodiment, the cryptographic chip is programmed to support remote attestation, whereby the network remotely determines whether or not user equipment hardware and/or software have been altered.

The private overlay provided herein can be used, e.g., for protecting the privacy of a user of a cellular platform (e.g., cellular telephone) in a cellular network or a wireless device in a wireless network. The system can comprise a system for distributing certified public keys in a public key cryptosystem wherein the system for distributing certified public keys in a public key cryptosystem provides the network and the authorized users of the cellular network with public encryption keys for the network and the authorized users. Private decryption keys may be generated and stored securely by the network and the authorized users through techniques that are known in the art.

FIG. 1 shows a schematic of a private overlay 10 for one embodiment of the system for protecting privacy of a user of a platform 40 in a network such as a cellular (or wireless) network. The private overlay 10 comprises a system for distributing certified public keys in a public key cryptosystem 20. Such systems are well known in the art. The platform 40 is comprised in the user equipment 30 (in this embodiment a cellular telephone), and the system for distributing certified public keys 20 provides the network and each authorized user of the network with a public encryption key for the network and each authorized user.

The private overlay uses existing cellular infrastructure to provide cellular voice and data services without creating a location and usage record tied to the user. As shown in FIG. 1, an identical certification message ("Encrypted: User Public Key") is sent to all authorized users.

As shown in FIG. 1, the user sends a certification message (which is identical for all valid users) and a random tag (shown in FIG. 1 as @(*&RND(*zx) from the user equipment 30 to enter privacy mode ("Encrypted: Network Public Key"). The certification message acts as zero-knowledge proof. The cryptographic chip, in this embodiment, a Trusted Platform Module (TPM) 60, insures that only a valid user would know the certification message, but the network does not know which user sent the message. The random tag serves as a privacy-enabled user's phone number. Privacy-enabled phones can include a TPM. The TPM can perform necessary public-key cryptographic functions and can track and enforce call minute limits Cloning can be prevented through remote attestation.

Also as shown in FIG. 1, a random tag can be used in the existing cellular infrastructure in place of a user ID for registration and call routing. No change to network infrastructure 50 (in this embodiment, the cellular network infrastructure) is necessary. The PKI or certification authority 20 supports private messaging (text and call control). Users generate public encryption keys and send them to the certification authority or PKI 20. Corresponding decryption keys are kept secret in a cryptographic chip 60 such as the TPM. This allows users to securely exchange random tags so that they can call each other and allows for secure call groups.

As shown in the detail in FIG. 1, the following is an example of public keys provided by the certification authority's Public Key Infrastructure:

| Public Key Infrastructure | |
|---|---|
| User | Public Key |
| PKI | )JKO#*$(*HFF(U |
| Network | KJHF(Y#$(*YFG__ |
| Individual user ("Steve Wicker") | )#(*)HEF(*Y#$H(* |

In one embodiment of the private overlay provided herein, the identity of the user is separated from a numeric tag that points to the cell in which the user equipment 30 can be paged. The private overlay 10 requires only the addition to the network of a certification authority such as the Public Key Infrastructure and Certification Authority (PKI) 20. The PKI provides the network and all subscribers with a public encryption key and a private decryption key. In addition, a private overlay to the existing cellular infrastructure can be established as follows. One can begin with a cellular telephone that has registered with the cellular network. Private registration is enabled by having the network transmit once a day (or at some suitable interval) an identical certification message to each authorized subscriber. The common certification message that is sent to all subscribers is encrypted using each subscriber's public encryption key.

It will be apparent to one of skill in the art that the above embodiment can be easily modified to be used with any wireless device in a wireless network (see FIG. 4), or with a customer data collection unit (e.g., a utility meter) in a communications network of a third party data reception and management system (see FIG. 8) or in a utility distribution system 5.2 Method for Protecting Privacy of a User of a Platform in a Network A method for protecting privacy of a user of a platform 40 in a network is also provided. The method comprises the step of providing a private overlay 10, the private overlay 10 comprising a system for distributing certified public keys in a public key cryptosystem 20, wherein the platform 40 is comprised in user equipment 30 and the system for distributing certified public keys 20 provides the network 50 and each authorized user of the network with a public encryption key for the network and each authorized user.

The user equipment can be, e.g., a cellular telephone, a computer or a customer data collection unit.

In another embodiment of the method, the system for distributing certified public keys is a Public Key Infrastructure and Certification Authority (PKI).

In another embodiment of the method, the platform is a cellular platform and the network is a cellular network. In another embodiment, the platform is a wireless platform and the network is a wireless network. In another embodiment, the platform is a customer data collection platform and the network is a communications network.

In another embodiment of the method, a private decryption key is generated and stored locally. Private decryption keys may be generated and stored securely by the network and the authorized users through techniques that are known in the art. The network associates the user equipment with a random number, as opposed to a telephone number, thus separating user equipment and user identity.

In another embodiment of the method, the platform is a cellular platform and the network is a cellular network, and the method further comprises the step of the cellular network associating the user equipment with a random number, as opposed to a telephone number, thereby separating the user equipment from user identity.

In another embodiment of the method, the platform is a wireless platform and the network is a wireless network, and the method further comprises the step of the wireless network associating the user equipment with a random number, as opposed to an account associated with an individual, thereby separating the user equipment from user identity.

In another embodiment of the method, the platform is a utility or third party data reception and management platform, the network is a communications network, and the communications network associates the user equipment (e.g., an electric meter, gas meter or water meter) with a random number, thereby separating the user equipment from user identity.

In another embodiment of the method, the private overlay comprises a cryptographic chip, wherein the cryptographic chip is built into the cellular platform, and programmed to keep a certification message in a cryptographically secure vault.

In another embodiment of the method, the cryptographic chip is a Trusted Platform Module (TPM).

In another embodiment of the method, the platform is cellular and the cryptographic chip is programmed to keep track of call minutes while the user equipment is in cellular mode.

In another embodiment of the method, call minutes are prepaid.

In another embodiment of the method, the platform is wireless and the cryptographic chip is programmed to keep track of wireless usage minutes while the user equipment is in wireless mode.

In another embodiment of the method, wireless usage minutes are prepaid.

In another embodiment of the method, the cryptographic chip is programmed to support remote attestation, and the method comprises the step of the network remotely determining whether the user equipment is authorized.

In another embodiment of the method, the cryptographic chip is programmed to support remote attestation, and the method comprises the step of the network remotely determining whether or not the user equipment has been cloned.

In another embodiment of the method, the cryptographic chip is programmed to support remote attestation, and the method comprises the step of the network remotely determining whether or not user equipment hardware and/or software have been altered.

In another embodiment, the method comprises the step of operating the platform in a private mode (e.g., private cellular or wireless mode), wherein the network is unable to associate location data for the platform with a specific user when the platform operates in the private mode.

In another embodiment of the method, the step of operating the platform in a private mode comprises the step of performing private registration, wherein private registration comprises the steps of:

the network periodically (e.g., at hourly intervals, 12 hour intervals, daily, weekly, etc.) transmitting an identical certification message to each authorized user of the network;

and the network encrypting the certification message that is transmitted to each authorized user using that user's public encryption key.

In another embodiment of the method, the step of the network periodically transmitting the identical certification message is performed daily.

In another embodiment of the method, the step of operating the platform (e.g., cellular or wireless platform) in private mode comprises the steps of:

the platform sending a Privacy Enabling Registration (PER) message to the network; and the platform encrypting the PER using the networks public encryption key, wherein the PER comprises the certification message and a Random Equipment Tag (RET).

In another embodiment of the method, the certification message in the PER acts as a zero-knowledge proof that shows the network that the PER was sent by a valid user and the certification message in the PER does not identify the user.

In another embodiment of the method, the RET is a random number.

In another embodiment, the method comprises the steps of:

entering the RET into a visitor location register (VLR) and the home location register (HLR) of the network; and treating the RET as a telephone number or account identifier, whereby the VLR and the HLR collect information needed to establish and maintain a cellular telephone or data call or a wireless data connection to the platform, but do not associate the information with a particular user, telephone number or user account identifier.

In another embodiment of the method, the cellular telephone or data call or the wireless data connection is incoming or outgoing.

In another embodiment, the method comprises the step of associating the RET with a temporary IP address.

In another embodiment of the method, the cellular telephone call is an incoming call, and the method comprises the step of:

distributing the user's RET and identity of the service provider of the cellular network (e.g., network ID) to parties from whom the user is willing to receive a cellular telephone call; wherein the distributing step uses public key encryption.

In another embodiment of the method, the user performs the distributing step.

In another embodiment of the method, a certification authority performs the distributing step.

In another embodiment the method comprises the step of building a cryptographic chip (e.g., TPM) into the cellular platform, wherein the cryptographic chip is programmed to keep the certification message in a cryptographically secure vault.

In another embodiment of the method, the cryptographic chip (e.g., TPM) is programmed to keep track of cellular telephone call minutes while the equipment is in cellular mode.

In another embodiment of the method, call minutes are prepaid. The cryptographic chip (e.g., TPM) can be enabled to terminate privacy mode when the allowed number of minutes has expired.

In another embodiment of the method, the cryptographic chip (e.g., TPM) supports remote attestation, and the method can comprise the step of the network remotely determining whether the equipment is authorized. For example, the network may contact the cryptographic chip and cause the cryptographic chip to perform computations on the privacy software and equipment ID to determine whether or not the equipment is valid (i.e. whether or not it is a clone), and whether or not the hardware and/or software has been tampered with.

In another embodiment of the method, the cryptographic chip is programmed to support remote attestation, and the method comprises the step of the network remotely determining whether or not the equipment has been cloned.

In another embodiment of the method, the cryptographic chip is programmed to support remote attestation, and the method comprises the step of the network remotely determining whether or not the equipment hardware and/or software have been altered.

5.3 Cryptographic Chip or Trusted Platform Module (TPM)

To prevent cloning of a cellular or wireless device, the user equipment can be equipped with a cryptographic chip 60 such as Trusted Platform Module (TPM) that is programmed to keep the certification message in a cryptographically secure vault. The TPM and other suitable cryptographic chips are known in the art. When the user wants to enter the private cellular (or wireless) mode, the user can cause the user equipment to send a Privacy Enabling Registration (PER) message to the network. The PER contains the certification message and a Random Equipment Tag (RET), and is encrypted using the networks public encryption key. The certification message in the PER acts as a zero-knowledge proof, showing the network that the PER was sent by a valid user, but without actually identifying the user. The RET is a random number that will be entered into the Home Location Register (HLR) and the Visitor Location Register (VLR) and treated as if it were a telephone number or user account identifier (individual account). This HLR/VLR record will be referred to as a private cellular or wireless context. It will contain all of the information that one finds in a standard HLR or VLR record, but will not be associated with a particular individual or his telephone number or individual account. So long as the user equipment remains in private cellular or wireless mode, subsequent registration messages will include the RET as opposed to the user's telephone number or individual account Cellular telephone call setup, mobility management, and roaming will all be handled exactly as before, with the difference that the HLR and VLR location information is associated with the RET, as opposed to a phone number. Data calls can be kept private by associating the RET with a temporary IP address.

The primary operational difference for the user lies with incoming calls (in the case of a cellular platform) or incoming data connections (in the case of a wireless platform). The only way an incoming call can be completed to user equipment in private cellular mode is if the calling party knows the called party's RET and network ID. (The latter is needed so that call setup requests can be directed to the appropriate HLR). The user in private cellular mode must thus distribute, using public key encryption, his or her RET to those parties from whom he or she would be willing to receive a call. Such distribution could also be handled through a certification authority. Clearly there are accounting and Communications Assistance for Law Enforcement Act (CALEA) issues to be addressed. The service provider may wish to limit the number of call minutes allowed for each PER. It would also be possible to rely on a TPM in the user equipment to enforce daily or monthly limits when the user equipment is in private cellular mode. CALEA concerns can be partly mitigated by having the user prepay for private cellular minutes, thus causing the phone to behave like a prepaid cellular phone.

The Trust Platform Module (TPM) was developed as a set of standards by the Trusted Computing Group™ (TCG). These standards are known in the art (see, e.g., TCG Specification Architecture Overview, Specification, Revision 1.4, 2 Aug. 2007; TPM Main: Part 1 Design Principles, Specification Version 1.2, Level 2 Revision 103, 9 Jul. 2007, Trusted Computing Group Design, Implementation, and Usage Principles, Version 2.01, Authorship: TCG Best Practices Committee, 1 Dec. 2005; all available as downloadable PDFs at www.trustedcomputinggroup.org or from Trusted Computing Group™, Beaverton, Oreg.).

The TPM performs a wide variety of functions, including the secure generation and use of cryptographic keys. These keys are used for several standardized purposes, including remote attestation, binding, signing, and sealing.

Remote attestation is a mechanism for verifying, often through an unforgeable hash algorithm, the state of the hardware and software of a computing device.

According to the TCG Specification Architecture Overview, Revision 1.4 (available as downloadable PDF at www.trustedcomputinggroup.org or from Trusted Computing Group™ Beaverton, Oreg.) "[a]ttestation is the process of vouching for the accuracy of information. External entities can attest to shielded locations, protected capabilities, and Roots of Trust. A platform can attest to its description of platform characteristics that affect the integrity (trustworthiness) of a platform. All forms of attestation require reliable evidence of the attesting entity. Attestation can be understood along several dimensions, attestation by the TPM, attestation to the platform, attestation of the platform and authentication of the platform." (TCG Specification Architecture Overview, Revision 1.4, pg. 5)

Attestation of the TPM itself is performed through the maintenance of a set of Platform Configuration Registers (PCRs). "Snapshots" of TPM functionality are measured and stored. Hashed versions of these measurements are referred to as "digests." The PCRs contain measurement digests.

According to the TCG Specification Architecture Overview, Revision 1.4, "[a] measurement kernel generates measurement events. A measurement event consists of two classes of data; 1) measured values—a representation of embedded data or program code and 2) measurement digests—a hash of those values. Data are scanned by the measurement kernel which generates a message digest. Digests are a snapshot of the machines operational state. The two data elements (measured values and measurement digest) are stored separately. The measurement digest is stored in the TPM using RTR and RTS functionality. The measured values may be stored virtually anywhere at the discretion of the measurement kernel. In fact, it may not be stored at all, but re-computed whenever the serialized representation is needed . . . . The TPM contains a set of registers, called Platform Configuration Registers (PCR) containing measurement digests. Algebraically, updates to a PCR follows as: PCR[n]←SHA-1 (PCR[n]+measured data). PCR values are temporal and are reset at system reboot. Verification of measurement events requires recreation of the measurement digest." (TCG Specification Architecture Overview, Revision 1.4, pg. 8)

Binding is the encryption of a message using a public key. Public key cryptography uses a pair of keys, one public and one private, to facilitate information security without the need for secure key transfer. Note that the TPM stores the private key as a "nonmigratable" key—the private key cannot be transferred to another device. The TPM assures the security of such keys by maintaining secure locations that cannot be tampered with or accessed.

According to the TCG Specification Architecture Overview, Revision 1.4, "TCG defines four classes of protected message exchange; Binding, Signing, Sealed-Binding (A.K.A. Sealing) and Sealed-Signing . . . . Binding is the traditional operation of encrypting a message using a public key. That is, the sender uses the public key of the intended recipient to encrypt the message. The message is only recoverable by decryption using the recipient's private key. When the private key is managed by the TPM as a nonmigratable key only the TPM that created the key may use it. Hence, a message encrypted with the public key, "bound" to a particular instance of a TPM. It is possible to create migratable private keys that are transferable between multiple TPM devices. As such, binding has no special significance beyond encryption." (TCG Specification Architecture Overview, Revision 1.4, pg. 15).

Signing is the generation of a digital signature. As discussed above, digital signatures are often used to enforce non-repudiation; the focus is more on insuring that the party who signs the message is who they say they are, as opposed to preventing others from reading the message.

According to the TCG Specification Architecture Overview, Revision 1.4, "[s]igning also in the traditional sense, associates the integrity of a message with the key used to generate the signature. The TPM tags some managed keys as signing only keys, meaning these keys are only used to compute a hash of the signed data and encrypt the hash. Hence, they cannot be misconstrued as encryption keys" (TCG Specification Architecture Overview, Revision 1.4, pg. 15).

Sealing requires not only that the receiving user have the necessary private key, but also that the decryption hardware be in a particular state. This state is attested through the use of the platform configuration registers (PCRs).

According to the TCG Specification Architecture Overview, Revision 1.4, "[s]ealing takes binding one step further. Sealed messages are bound to a set of platform metrics specified by the message sender. Platform metrics specify platform configuration state that must exist before decryption will be allowed. Sealing associates the encrypted message (actually the symmetric key used to encrypt the message) with a set of PCR register values and a non-migratable asymmetric key . . . . A sealed message is created by selecting a range of PCR register values and asymmetrically encrypting the PCR values plus the symmetric key used to encrypt the message. The TPM with the asymmetric decryption key may only decrypt the symmetric key when the platform configuration matches the PCR register values specified by the sender. Sealing is a powerful feature of the TPM. It provides assurance that protected messages are only recoverable when the platform is functioning in a very specific known configuration." (TCG Specification Architecture Overview, Revision 1.4, pg. 15-16)

Signing can also be sealed; i.e., tied to the state of the PCR registers. According to the TCG Specification Architecture Overview, Revision 1.4, "Sealed-Signing . . . Signing operations can also be linked to PCR registers as a way of increasing the assurance that the platform that signed the message meets a specific configuration requirement. The verifier mandates that a signature must include a particular set of PCR registers. The signer, during the signing operation, collects the values for the specified PCR registers and includes them in the message, and as part of the computation of the signed message digest. The verifier can then inspect the PCR values supplied in the signed message, which is equivalent to inspecting the signing platform's configuration at the time the signature was generated." (TCG Specification Architecture Overview, Revision 1.4, pg. 15)

The TPM provides a number of other services. The standardized TPM commands are summarized in section 4.6.3 of the TCG Specification Architecture Overview. The excerpt illustrated in FIG. 2 notes that Sign, GetRandom, and StirRandom, commands are made available for general cryptographic purposes, such as generating keys.

The TPM GetRandom command, as seen in the following excerpt from the TPM Main Part 3 Commands, Specification Version, returns a requested number of bytes from a random number generator:

"13.6 TPM_GetRandom

Start of informative comment:

GetRandom returns the next bytesRequested bytes from the random number generator to the caller.

It is recommended that a TPM implement the RNG in a manner that would allow it to return RNG bytes such that the frequency of bytesRequested being less than the number of bytes available be a infrequent occurrence.

. . . .

Actions

1. The TPM determines if amount bytesRequested is available from the TPM.
2. Set randomBytesSize to the number of bytes available from the RNG. This number MAY be less than randomBytesSize.
3. Set randomBytes to the next randomBytesSize bytes from the RNG" (TPM Main Part 3 Commands. Specification Version 1.2, pg. 91)

The StirRandom command adds entropy to the state of the random number generator by updating the state of the random number generator:

"13.7 TPM_StirRandom

Start of informative comment:

StirRandom adds entropy to the RNG state.

. . . .

Actions

The TPM updates the state of the current RNG using the appropriate mixing function." (TPM Main Part 3 Commands. Specification Version 1.2, pg. 92)

The portion of the standard that focuses on design principles can be obtained from "TPM Main: Part 1 Design Principles, Specification Version 1.2, Level 2 Revision 103, 9 Jul. 2007, available as downloadable PDF at www.trustedcomputinggroup.org or from Trusted Computing Group™, Beaverton Oreg.) which is referred to herein as "TPM Main Part 1." As described below, TPM Main Part 1 places implementation requirements on the designer that must be followed if the resulting TPM is to be compliant with the standard:

"TPM designer MUST review and implement the information in the TPM Main specification (parts 1-4) and review the platform specific document for the intended platform. The platform specific document will contain normative statements that affect the design and implementation of a TPM." (TPM Main Part 1, pg. 1)

The basic elements of the TPM are depicted in FIG. 3. The cryptographic co-processor, shown on the upper left of the above diagram, is designed to implement various cryptographic functions in conjunction with the other elements of the architecture, as described below.

TPM Main Part 1 states that "The cryptographic co-processor, FIG. 2:*a* C1, implements cryptographic operations within the TPM. The TPM employs conventional cryptographic operations in conventional ways. Those operations include the following:

Asymmetric key generation (RSA)

Asymmetric encryption/decryption (RSA)

Hashing (SHA-1)

Random number generation (RNG)

The TPM uses these capabilities to perform generation of random data, generation of asymmetric keys, signing and confidentiality of stored data.

The TPM may symmetric encryption for internal TPM use but does not expose any symmetric algorithm functions to general users of the TPM.

The TPM may implement additional asymmetric algorithms. TPM devices that implement different algorithms may have different algorithms perform the signing and wrapping.

(TPM Main Part 1, pg. 12)

As discussed above, encryption algorithms may be both symmetric and asymmetric (public-key). The keys for these algorithms may also be referred to as symmetric or asymmetric. As discussed below, the TPM is not designed to provide exposed symmetric key cryptography. It is limited to the generation, storage, and protection of these keys for use by another device. Generation of symmetric keys may be performed using the random number generator (RNG). Binding and sealing may be used for transport of these keys once generated.

TPM Main Part 1 states that "As the TPM does not have an exposed symmetric algorithm, the TPM is only a generator, storage device and protector of symmetric keys. Generation of the symmetric key would use the TPM RNG. Storage and protection would be provided by the BIND and SEAL capabilities of the TPM. If the caller wants to ensure that the release of a symmetric key is not exposed after UNBIND/UNSEAL on delivery to the caller, the caller should use a transport session with confidentiality set . . . . For asymmetric algorithms, the TPM generates and operates on RSA keys. The keys can be held only by the TPM or in conjunction with the caller of the TPM. If the private portion of a key is in use outside of the TPM it is the responsibility of the caller and user of that key to ensure the protections of the key." (TPM Main Part 1, pg. 13)

The following examples are offered by way of illustration and not by way of limitation.

6. EXAMPLES

6.1 Example 1: Private Cellular Overlay

This example demonstrates a private overlay for cellular systems that protects user privacy by strictly separating equipment identity from user identity.

Introduction: Public Key Cryptography

Public key cryptography allows for two distinct keys, one for encryption and the other for decryption. Any piece of plaintext that is encrypted using the encryption key can only be decrypted if one has the decryption key. If properly designed, it is not possible to obtain one key from the other without solving a very hard mathematical problem. One can thus make the encryption key public, perhaps by posting it online, so that anyone can encrypt a message and send it to the intended user without fear of the message being readable by anyone who does not have the secret decryption key. The message will remain secure so long as the decryption key is kept secret. Diffie and Hellman introduced public key cryptography in 1976. The next significant step was taken in the late 1970s by Rivest, Shamir, and Adleman with their invention of the RSA cryptosystem (the acronym contains the first letter of each of the inventors' last names). The RSA cryptosystem implements public key cryptography with an algorithm known in the art (the implementation relies primarily on exponentiation modulo a large number). The security of the RSA cryptosystem is based on the difficulty of factoring very large numbers of the form A×B, where A and B are large prime numbers. It has never been conclusively proven, but it is generally believed that the only way to obtain a well-selected RSA decryption key from the corresponding encryption key (or vice versa) is to factor the product of two large primes. This is a well-understood problem that is known to be very difficult. RSA keys are much larger than symmetric system keys, but not so much as to be unworkable. 3072-bit RSA keys are generally felt in the art to provide the same level of security as 128-bit keys in symmetric key systems (See, e.g., http://csrc.nist.gov/publications/nistpubs/800-57/sp800-57-Part1-revised2_Mar08-2007.pdf). Another remarkable aspect of having two distinct keys is that the system can be used to generate secure digital signatures as well as providing secure communication.

For example, suppose that a buyer writes a letter to an on-line bookseller ordering several hundred copies of a single book title. Upon receiving the letter, the seller may want to verify that it was indeed that individual buyer who sent the letter. Further suppose that the buyer has published an RSA decryption key, while keeping the corresponding encryption key secret. Along with a plaintext copy of the letter, the buyer can send the seller an encrypted copy, one that has been encrypted using the buyer's secret encryption key. When the seller applies the buyer's public decryption key, the seller will recover the plaintext and see that it is identical to the buyer's letter. The seller will then be convinced that the buyer indeed sent the letter, as only the buyer is in possession of the encryption key needed to create the encrypted copy. Such a guarantee can be formalized, as discussed below. The cryptogram in this example is a digital signature that anyone can read, but only the buyer can generate. In many ways a digital signature is actually more secure than the old fashioned variety of signature, as a digital signature cannot be transferred to a different document—it is always associated with the text that was encrypted in its creation.

Taken a step further, suppose that a group of individuals generates two sets of keys, the first set for encrypting content, and the second for generating digital signatures. The group publishes the encryption key from the first set and the decryption key from the second, while keeping the other half of each key pair secret. Suppose that one member of the group, Alice, wants to send a signed, secret message to another member of the group named Bob. Alice will first convert the message into a signature by encrypting it with her secret encryption key. She will then encrypt the signature using Bob's public encryption key. So the original message has now been encrypted twice, first with Alice's secret encryption key, then with Bob's public encryption key. When Bob receives the cryptogram, he must first apply his secret decryption key to recover the signature. He will then apply Alice's public decryption key to recover the original message, while simultaneously convincing himself that the letter is in fact from Alice.

Thus public key cryptography has a strong role to play in trusted communication. But one piece is still missing: in the above communication between Alice and Bob, Alice assumed that Bob's public encryption key was actually generated by Bob. But what if Eve (an eavesdropper) published the key while pretending to be Bob? If she were able to do this, then any secret message intended for Bob would be readable by Eve. In order to prevent this, public keys have to be authenticated. In other words, a recipient of Bob's signed, secret message must be convinced that Bob's key was in fact generated by Bob, and that only Bob will have the corresponding private key. Or to put this in more modern terms, we want to be sure that when we use a public key to send, e.g., our credit card information to an on-line seller, it really is that on-line seller that provided the key.

The current art-known solution to this problem takes the form of a public key certificate. A public key certificate binds a public key to a person's identity in much the same way that a passport binds information about an individual (name, date of birth, place of birth, etc.) to a passport photograph. A passport is an official document that is issued by a trusted third party, the Federal government.

The Federal government will not issue a passport until the requesting user provides sufficient documentation to insure that the user is who she says she is. Once the Federal passport agency receives all of the necessary documentation and several photographs, the agency will verify the documents and issue the passport. Airport and immigration authorities are presumably familiar with this process. When they see a passport and compare the enclosed picture to the bearer's face, they are then willing to associate the data on the document with the bearer. Public key certificates are created and used in much the same manner.

Currently, E-commerce retailers go to a registration authority and present sufficient documentation to prove their corporate identities. Once their identities have been verified, an associated certification authority generates the public key and places it on the certificate, binding it to information about the entity associated with the key. The certification authority will digitally sign the certificate so that it can be verified by the certified entity's customers. The registration and certification authorities and other, related functionality is often found under the head of a single entity called the public key infrastructure (PKI). Several large companies, such as VeriSign, have emerged as dominant PKIs for Internet commerce. They establish trust through a variety of means, including their reliability, cash warrantees as high as $250,000 (see http://www.verisign.com/ssl/buy-ssl-certificates/index.html?tid=a_box), and the fact that their value as a corporation would vanish overnight if they abused the trust placed in them. Many web browsers are configured to automatically accept certificates from known PKIs, thus freeing the human user from having to worry about such things.

For example, suppose a buyer wishes to go online to an on-line bookseller's website to buy several copies of a book. The buyer would first enter the bookseller's URL into the URL line at the top of his browser and make his way to the bookseller's home page. The buyer would then place copies of the book into a virtual shopping cart and proceed to checkout. It is at this point that the cryptographic action begins, unbeknownst to most users. The seller will send the buyer's browser a certificate containing a public encryption key. If the buyer wishes, he can actually view the certificate by clicking on the displayed lock icon that indicates secure browsing. These certificates contain a lot of information, including the signing authority, the public encryption key, and the intended encryption algorithm. For this example, the certificate is signed by an authentication service, e.g., Veri- Sign, and calls for RSA encryption with a 2040-bit key. Having verified the certificate, the buyer's browser will generate a 128 or 256-bit key for a symmetric key cryptosystem. This key will be encrypted using the RSA public encryption key provided on the certificate, and the resulting cryptogram will be sent to the online seller. The seller and buyer now share a secret symmetric key, and they can now converse securely. There is no doubt that e-commerce rests on the trust generated through the security of public key cryptography and trusted third parties, e.g., authentication services such as VeriSign.

Despite the efforts of some governmental agencies, the commercial sector has enjoyed expansion of markets while the public has enjoyed a greater range of buying opportunities. The following example demonstrates that using the methods disclosed herein, public key cryptography can be modified to support the privacy interests of individuals.

Private Cellular Overlay

So long as the cellular concept requires that a piece of equipment be located within a particular cell, there will be a requirement in cellular systems that an MSC be able to locate user equipment at the level of one or a small number of cell sites. It is important to note, however, that it is the equipment that needs to be located and not a specific, named subscriber. A private overlay for cellular systems is provided herein (FIGS. 1 and 4) that protects user privacy by strictly separating equipment identity from user identity. The embodiment of the private cellular overlay described in this example employs a system for distributing certified public keys in a public key cryptosystem. Keys are certified using a PKI-type process, as would be understood by a person of skill in the art.

The system for distributing certified public keys in a public key cryptosystem, certification authority, or PKI (or its functional equivalent) provides the network and all subscribers with a public encryption key and a private decryption key. With this addition, a private overlay to the existing cellular infrastructure can be established as follows.

This example describes an embodiment in which a cellular telephone is used with standard capabilities to which has been added the ability to operate in a private mode, i.e., a mode in which the network is unable to associate location data for the phone with a specific user. It will be apparent to one of skill in the art that other embodiments using other cellular or wireless platforms known in the art can also be envisioned.

The private mode is predicated on a private registration process, which is enabled by having the network transmit once a day (or at some suitable interval) an identical certification message to each authorized subscriber. The certification message that is sent to each subscriber is encrypted using that subscriber's public encryption key.

When the user wants to enter the private cellular mode, the user causes the cellular platform to send a Privacy Enabling Registration (PER) message to the network. The PER, consisting of the certification message and a Random Equipment Tag (RET), is encrypted using the networks public encryption key. The certification message in the PER acts as a zero-knowledge proof, showing the network that the PER was sent by a valid user, but without actually identifying the user (the problem of cloning will be addressed below).

The RET is a random number that can be entered into the visitor location register (VLR) and the home location register (HLR) and treated as if it were a phone number. The VLR and the HLR can thus collect all of the information needed to establish and maintain phone calls to the cellular platform, but will not associate this information with a particular individual or phone number. So long as the user equipment remains in private cellular mode, subsequent registration messages will include the RET as opposed to the user's telephone number.

Call setup, mobility management, and roaming can all be handled exactly as before, with a difference being that the HLR and VLR location information is associated with the RET, as opposed to a telephone number. Data calls can be kept private by associating the RET with a temporary IP address. One version of the General Packet Radio Service (GPRS) standard known in the art allowed for an anonymous Packet Data Protocol (PDP) context. This context associated a PDP address at the SGSN with a temporary logical link identifier; the IMSI was not associated with the PDP address, and the context was thus anonymous. The details were described in early versions of section 9.2.2.3 of ETSI GSM 03.60, but were later removed from the standard.

Incoming calls require that calling parties know the RET. In order for the RET to be associated with the correct HLR, the calling party can identify the service provider that serves the called party. The user in private cellular mode can thus distribute, using public key encryption, his or her RET and the identity of the service provider to those parties from whom he or she would be willing to receive a call. Calls can be placed from the cellular platform in private mode using the private context developed for incoming calls, or alternatively, outgoing calls can be registered on a call-by-call basis using distinct random strings. This would reduce the amount of information associated with a single random string, thus reducing the ability of the service provider to associate the private context with a specific user.

Both cloning and billing can be addressed by building a Trusted Platform Module (TPM0 into the cellular platform. The TPM (or an equivalent device) can be programmed to keep the certification message in a cryptographically secure vault, and thus unavailable to anyone wishing to transfer it to another platform. When the network receives a PER message, it can thus be assured that the transmitting phone actually received the certification message from the network. Remote attestation can be used to ensure that the software controlling the TPM has not been altered.

With respect to billing, the service provider faces the uncomfortable task of providing service to an unknown party. The solution lies, once again, in the TPM. The number of private call minutes available to the platform can be controlled through software in the platform, with the software certified by remote attestation. In one embodiment, the private call minutes can be prepaid. The potential for considering the private mode as a prepaid service has a significant advantage with respect to the Communications Assistance for Law Enforcement Act (CALEA), as CALEA does not currently cover prepaid cellular telephones. In the United States and many other countries, one may buy and use a prepaid cellular telephone without associating one's name with the phone. The privacy overlay disclosed herein would thus provide postpaid cellular telephone users with the privacy benefits of prepaid cellular.

6.2 Example 2: Anonymous Authentication

This example and Example 6.3 consider cases in which privacy-aware design practices are applied to information networking. This example demonstrates a privacy overlay that solves a problem that is generic to information networking (e.g., cellular, wireless), the need for user authentication, while making an effort to minimize the identification of data with individuals. This example demonstrates that the nonattribution requirement creates a need for tools that will support the practicing engineer in his or her development of privacy-aware systems. In Section 6.3, Example 3, a privacy-aware demand response system is disclosed. In Example 3, several architectural issues are also addressed, emphasizing the importance of the distributed processing requirement.

The authentication problem arises in mobile computing and communications networks in many different scenarios, from placing a cellular telephone call to obtaining Internet access in a coffee shop. The authentication problem is thus proving to a service provider that you are who you say you are. But if one digs a bit under the surface with a mind towards minimizing the identification of equipment with the individual, it can be seen that the true nature of the problem from the standpoint of the service provider is ensuring that payment will be received for services provided. The nonattribution requirement may thus be satisfied; it is not necessary that the service provider knows to whom the services are being provided, so long as the guarantee of payment is in place. If anonymous authentication can be established, any data collection entailed by the operation of the service (such as the location data required for the routing of incoming calls to a cellular telephone) will be anonymous.

Anonymous authentication can be characterized as a zero-knowledge proof. The user would like to prove to the service provider that he or she is one of a pool of authorized users, without providing any personally identifying information. One possible solution lies in the scheme for the specific application of cellular telephony disclosed in Section 6.1, Example 1 (FIG. 1), although it can be applied, as will be apparent to the skilled practitioner, to many applications, e.g., wireless networks or communications networks for utility or third party data reception and management. A public key infrastructure (PKI) can be provided that can distribute public keys for the network and its users. The service provider periodically distributes certification messages to all users that are authorized to use the network. The certification message is identical for all users, but is encrypted using each specific user's public key. The encrypted certification message may be transmitted using e-mail, a wireless control channel, or whatever means is appropriate for the application. In some embodiments, the certification message may not be transferable, in which case a cryptographic vault technology, such as a trusted platform module (TPM), can be employed.

When the user wishes to authenticate to obtain service, the certification message is sent back to the network along with a random tag that can be used to identify the equipment. The authentication message is encrypted using the network's public key. Upon receiving this message, the network knows that the user requesting access is valid, as the user knew the certification message. The network does not, however, know the identity of the user. The network can then use the random tag to contact and provide access to the user equipment as needed.

The above example of a privacy overlay demonstrates the application of the nonattribution requirement: a system for protecting user privacy is established by which the network may interact and, if necessary, track the user equipment without knowing to whom the equipment belongs. This design serves to protect the user's privacy and enable private and anonymous consumption.

6.3 Example 3: Demand Response and Distributed Processing

Utilities are adopting microgrids and other systems that will provide cost savings in power generation, increase grid reliability and flexibility, and create new modes of consumer-utility interaction (see, e.g., Federal Energy Regulatory Commission, (2009, September). 2009 Assessment of demand response and advanced metering, Staff Rep. http://www.ferc.gov/legal/staff-reports/sep-09-demand-response.pdf). Demand response systems will play a key role in this effort. Generally speaking, demand response systems modify electricity consumption behavior by end-use customers in response to changes in the price of electricity over time (M. H. Albadi and E. F. El-Saadany, A summary of demand response in electricity markets, Electric Power Syst. Res., vol. 78, pp. 1989-1996, 2008). The modifications, whether induced by presenting pricing information to the customer or through direct control of appliances by the utility, may alter the timing of demand, the level of instantaneous demand, or the total demand over a given period of time (OECD, International Energy Agency, The Power to Choose—Demand Response in Liberalized Electricity Markets, Paris, France, 2003). The overall goal is to balance electricity consumption over time, alleviating the utilities' (expensive) need to take generators online and offline.

Demand response systems require power consumption information at a level of granularity far finer than that required for monthly billing. The reason is simple: if consumption is to be modified in accord with price over the course of the day, then consumption information must be available at the same level of granularity as the pricing information in order to properly bill the customer. The solution lies in advanced metering infrastructure (AMI), i.e., technology that can sample and record power consumption on a minute-by-minute basis, as opposed to the once-a-month meter readings of the past. AMI deployment has been underway for several years. The Federal Energy Regulatory Commission estimated that there were 7.95 million advanced meters installed nationwide in 2009 (Federal Energy Regulatory Commission. (2009, September). 2009 Assessment of demand response and advanced metering, Staff Rep., http://www.ferc.gov/legal/staff-reports/sep-09-demand-response.pdf). By 2009, 26 utilities in 19 states had announced or pursued advanced metering pilots or full-deployment programs.

The potential impact of demand response is immense. As seen in FIG. 5 (taken from Federal Energy Regulatory Commission, 2009, June, A National assessment of demand response potential, Staff Rep. Download: http://www.ferc.gov/legal/staff-reports/06-09-demand-response.pdf), depending on the extent of the distribution of AMI, the potential savings in energy in the United States during the peak summer period for electrical demand ranges from 4% to 20% of total load. The subsequent positive impact on the United States need for foreign oil and related resources would be difficult to overstate.

Looking more closely at FIG. 5 one can see that the extent of the power savings is a function of AMI participation. An explanation of the various scenarios is provided in FIG. 6.

In comparing FIG. 6 to FIG. 5, note that the energy savings from the Bopt-in participation scenario is estimated at 9%, while that of the mandatory, universal approach is 20%. An additional 11% reduction in peak consumption is thus available if regulators require that consumers have advanced metering installed in their homes. This will be an issue of national significance, for unless AMI is employed properly, it poses a serious privacy threat.

Lisovich et al. showed that the detailed power consumption data collected by advanced metering systems reveals information about in-home activities (see M. Lisovich, D. Mulligan, and S. B. Wicker, Inferring personal information from demand-response systems, IEEE Security Privacy Mag., vol. 8, no. 1, pp. 11-20, January/February 2010). Furthermore, such data can be combined with other readily available information to discover even more about occupants' activities (M. Lisovich, D. Mulligan, and S. B. Wicker, Inferring personal information from demand-response systems, IEEE Security Privacy Mag., vol. 8, no. 1, pp. 11-20, January/February 2010). This result followed from an experiment conducted in a standard student residence (with the appropriate privacy safeguards and the express permission of the resident). An energy usage monitor manufactured was attached to the residence's breaker panel to collect real-time power consumption data. The data, obtained at intervals of 1 or 15 s with a resolution of 1 W, were transferred to a nonintrusive load monitor (NILM) application running on a workstation. A behavior extraction algorithm was then run on the workstation in an attempt to predict behavior based solely on power consumption. Video data were used to establish a control for the experiment.

Figure 7C:
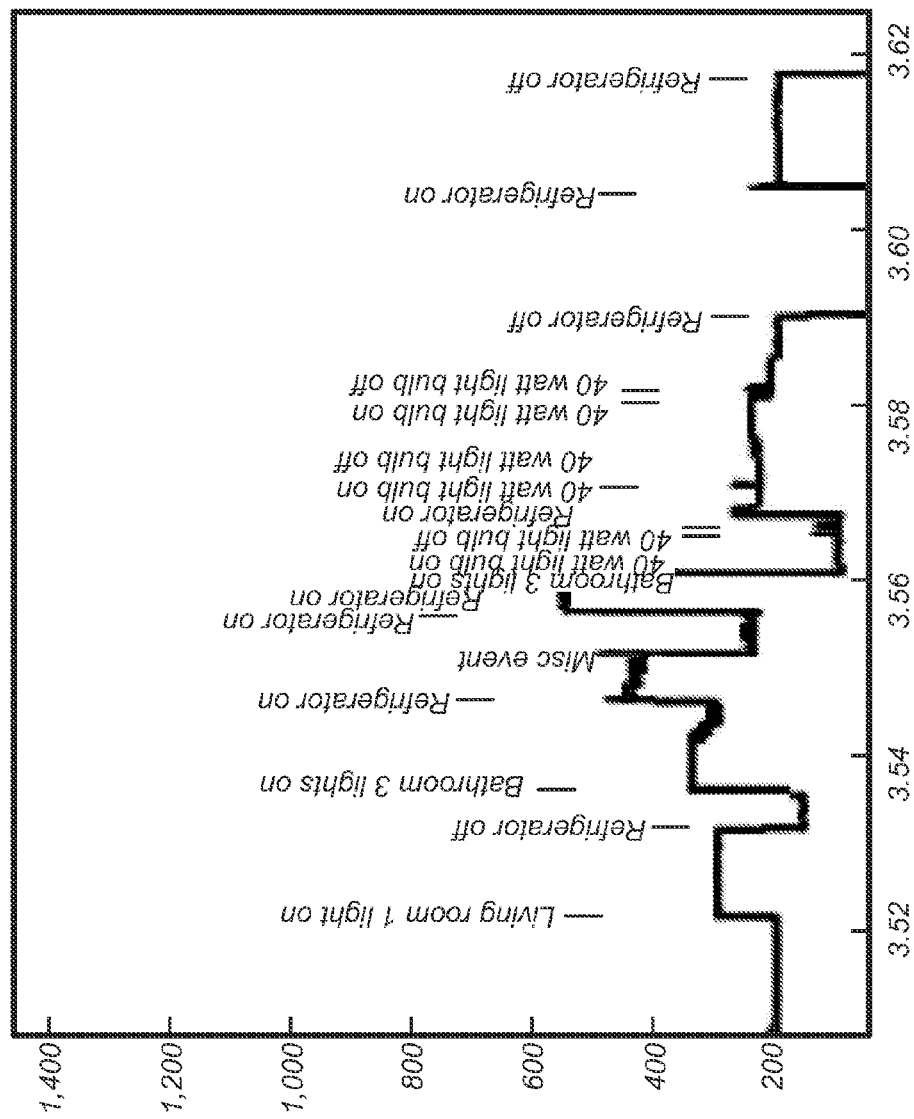

Some of the results from the experiment are reproduced in FIGS. 7a-d. FIG. 7(a) depicts aggregate power consumption data over the course of several days. The vertical axis is labeled in watts, while the horizontal axis depicts the passage of time over the course of several days. There are several substantial power consumption peaks over the course of each day, indicating activity within the residence.

FIG. 7(b) illustrates the results of an edge detection algorithm applied to the power consumption data collected over several hundred seconds. The edge detection algorithm is quite simple and known in the art: the graph depicts the difference between power consumption samples that are adjacent in time. The vertical axis depicts $\Delta(t)=P(t)-P(t-1)$, where P(t) is the power consumption sampled at time t. The horizontal axis reflects time. Note that certain switching events can now be isolated; the power consumption transients created by a refrigerator and a microwave oven are easily seen.

FIG. 7(c) is a screen shot taken from a load-identifying program. It shows how events can be isolated and classified over the course of a day (the units of the horizontal axis is days). With this type of information, we can proceed to estimate the behavior of the individuals within the home.

Figure 7D:
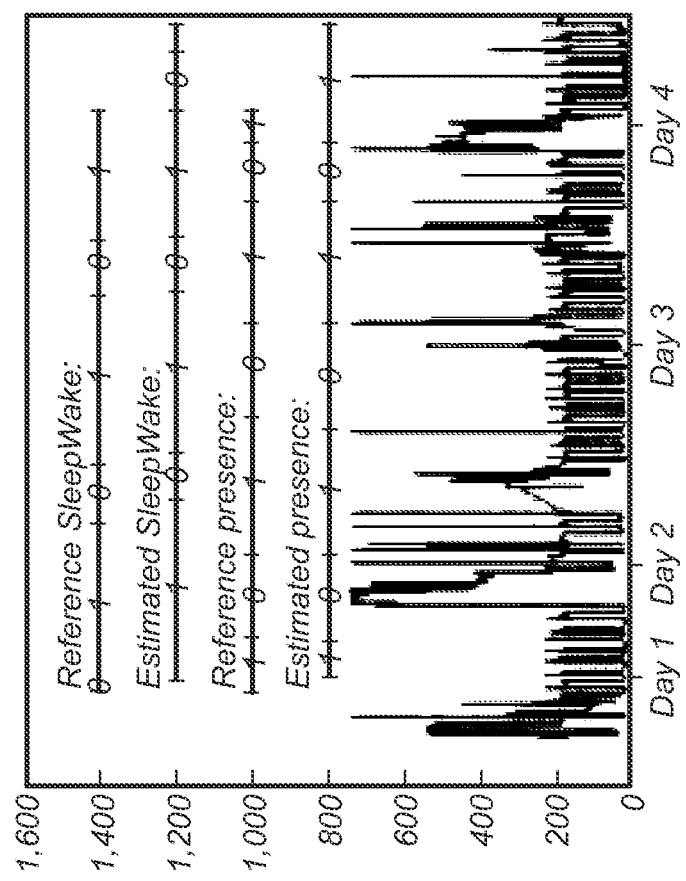

FIG. 7(d) shows that power consumption data can be used to estimate variables related to personal behavior. The reference lines show actual behavior. On the "Reference SleepWake" line, a zero indicates that the occupant was asleep; a one indicates that he was awake. On the "Reference presence" line, a zero indicates that the occupant of the residence was not at home; a one indicates that he was at home. The estimated lines indicate our estimates of these events. Note how close the reference data are to the estimates.

Given that power consumption data creates a privacy problem, it is clear that centralized collection may prove unsettling to customers of the utilities that implement it. Yet centralized collection would appear to be the direction being taken. In the following excerpt from the 2006 FERC "Assessment of Demand Response and Advanced Metering," AMI is defined as a system that provides for centralized collection. There seems to be no allowance for architectural options that are more sensitive to the privacy needs of the consumer.

For purposes of this report, Commission staff defined "advanced metering" as follows: "Advanced metering is a metering system that records customer consumption [and possibly other parameters] hourly or more frequently and that provides for daily or more frequent transmittal of measurements over a communication network to a central collection point" (Federal Energy Regulatory Commission, Assessment of demand response and advanced metering, Washington, D.C., Staff Rep., Docket No. AD06-2-000, August 2006, p. vi).

The above definition has since been quoted by utilities and is recognized in the art (E. Steel and J. Angwin, On the web's cutting edge, anonymity in name only, Wall Street J., Aug. 4, 2010). It has also been represented graphically in Advanced Metering Infrastructure (AMI) literature distributed by FERC, as seen in FIG. 8 (Engineering Power Research Institute, Advanced Metering Infrastructure, http://www.ferc.gov/eventcalendar/Files/20070423091846-EPRI%20-%20Advanced%20Metering.pdf). Note that reference is made to the potential for third party data reception and management. This arguably increases the potential for unregulated use of the acquired data, including commodification and subsequent reuse by marketers and others.

The long-term future of the demand response program may be at risk. Consumers may become alarmed at the potential invasion of privacy, motivating legislation calling for an expensive retooling of the system. Judicial action may also put the program at risk. Whether from public outcry or judicial action, systems that forsake privacy awareness may find themselves shut down.

When demand response systems are viewed through the lens of privacy-aware design, however, a privacy preserving solution is apparent. The goal of demand response systems is to modify consumption behavior, whether through inducement or direct control, by exploiting fine-grained pricing information. The behavior of interest—consumption—is highly distributed. With the distributed processing requirement in mind, it becomes clear that it is not the power consumption data that need to be collected, but it is instead the pricing data that need to be distributed. Fine-grained consumption information need never leave the immediate neighborhood, thus alleviating most privacy concerns.

Privacy-aware demand response architecture must account for several different data flows. For each of them, a privacy analysis should be performed and a privacy-aware design adopted as necessary. First, in systems that seek to alter consumer behavior, pricing data must be presented to the consumer so that he/she has a basis upon which to make consumption decisions. This does not present a privacy concern, as the utility can broadcast the pricing to the residential meter and/or to an application on the consumer's home computer.

Second, in direct control systems, the utility has to send signals to appliances to control their electricity consumption over the course of the day. Though this may create a significant security issue, it does not provide information about consumer behavior and preferences within the home.

The third flow is more problematic. Consumer-specific consumption data must be provided to the utility for billing purposes. There is an issue here, as one cannot stream consumption data to the utility without creating the aforementioned privacy issue. One also cannot stream real-time cost data, as it would be trivial to convert this information back into consumption data. The solution lies in accumulating price-weighted consumption data at the residence and then sending the aggregate cost to the utility on a weekly or monthly basis. This implies a level of security at the meter that requires a trusted platform module or the equivalent.

Finally, the utility needs consumption data, temporally precise, but aggregated at the level of the consumer, in order to predict demand and maintain a price model. Typically, aggregated real power consumption data at the substation level are sufficient to predict the need for new transmission and distribution lines and generation necessary to service the predicted demand. A neighborhood aggregator can be used to combine and anonymize data so that the desired temporal granularity is provided without generating information about individual behavior. Anonymization can be performed by summing the power consumption data for a sufficient number of customers so that a single customer's data cannot be isolated. The above solutions are embedded in the architecture depicted in FIG. 9.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A system for protecting privacy of an authorized user of a platform in a network, the system comprising:
   a private overlay 10, the private overlay comprising a system for distributing certified public keys in a public key cryptosystem 20; and
   a platform 40, the platform operating in a private mode, having a private encryption key, and comprised in authorized user equipment 30,
   wherein:
   the system for distributing certified public keys provides the network and each authorized user with a public encryption key for the network and for each authorized user,
   the private overlay does not create a location and usage record tied to the authorized user,
   the network is unable to associate location data for the platform with a specific user when the platform operates in the private mode, and
   the network performs private registration, the private registration comprising:
      the network periodically transmitting an identical certification message to each authorized user,
      the network encrypting the certification message that is transmitted to each authorized user using that user's public encryption key, and
      the platform storing the certification message in a cryptographically secure vault such that the certification message cannot be accessed by an authorized user,
   wherein:
   the platform operating in the private mode enters the private mode by:
      appending a random tag to the certification message,
      signing the certification message having the appended random tag using the platform's private key,
      encrypting the signed certification message having the appended random tag using the network's public key, and
      transmitting the encrypted, signed certification message having the appended random tag to the network, and
   the network uses the appended random tag to address the platform, to track the platform and/or to provide services to the platform.

2. The system for protecting privacy of claim 1 wherein the user equipment is a cellular or mobile telephone, a computer or a customer data collection system, a utility meter, or a wired terminal.

3. The system for protecting privacy of claim 1 wherein the system for distributing certified public keys is Public Key Infrastructure and Certification Authority (PKI).

4. The system for protecting privacy of claim 1 wherein:
   the platform is a cellular platform and the network is a cellular network,
   the platform is a wireless platform and the network is a wireless network, or
   the platform is a utility platform or third party data reception and management platform and the network is a communications network that communicates with a customer data collection unit.

5. The system for protecting privacy of claim 1 comprising a cryptographic chip 60, wherein the platform comprises the cryptographic chip and wherein the cryptographic chip is programmed to keep the certification message in the cryptographically secure vault.

6. The system for protecting privacy of claim 5 wherein the cryptographic chip is a Trusted Platform Module (TPM).

7. The system for protecting privacy of claim 5 wherein the cryptographic chip is programmed to support remote attestation, whereby the network remotely determines whether user equipment is authorized.

8. The system for protecting privacy of claim 5 wherein the cryptographic chip is programmed to support remote attestation, whereby the network remotely determines whether user equipment has been cloned.

9. The system for protecting privacy of claim 5 wherein the cryptographic chip is programmed to support remote attestation, whereby the network remotely determines whether user equipment hardware and/or software has been altered.

10. The system for protecting privacy of claim 1 wherein the cryptographically secure vault is a Trusted Platform Module (TPM).

11. A method for protecting privacy of an authorized user of a platform in a network, the method comprising:
    providing a private overlay 10 to the authorized user, the private overlay comprising a system for distributing certified public keys in a public key crypto system 20;
    providing a platform 40 to the authorized user, the platform operating in a private mode, having a private encryption key, and comprised in authorized user equipment 30;
    the system for distributing certified public keys providing the network and each authorized user with a public encryption key for the network and for each authorized user,
    wherein:
    the private overlay does not create a location and usage record tied to the authorized user,
    the network is unable to associate location data for the platform with a specific user when the platform operates in the private mode; and
    the network performing private registration, the private registration comprising:
       the network periodically transmitting an identical certification message to each authorized user, the network encrypting the certification message that is transmitted to each authorized user using that user's public encryption key, and the platform storing the certification message in a cryptographically secure vault such that the certification message cannot be accessed by an authorized user, wherein:
the platform operating in the private mode enters the private mode by:
appending a random tag to the certification message,
signing the certification message having the appended random tag using the platform's private key,
encrypting the signed certification message having the appended random tag using the network's public key, and
transmitting the encrypted, signed certification message having the appended random tag to the network, and
the network uses the appended random tag to address the platform, to track the platform and/or to provide services to the platform.

12. The method of claim 11 wherein the user equipment is a cellular or mobile telephone, a computer or a customer data collection system, a utility meter, or a wired terminal.

13. The method of claim 11 wherein the system for distributing certified public keys is Public Key Infrastructure and Certification Authority (PKI).

14. The method of claim 11 wherein:
the platform is a cellular platform and the network is a cellular network,
the platform is a wireless platform and the network is a wireless network, or
the platform is a utility platform or third party data reception and management platform and the network is a communications network that communicates with a customer data collection unit.

15. The method of claim 11 wherein the platform comprises a cryptographic chip, and wherein the cryptographic chip is programmed to keep the certification message in the cryptographically secure vault.

16. The method of claim 15 wherein the cryptographic chip is a Trusted Platform Module (TPM).

17. The method of claim 15 wherein the cryptographic chip is programmed to support remote attestation, the method comprising the network remotely determining whether user equipment is authorized.

18. The method of claim 15 wherein the cryptographic chip is programmed to support remote attestation, the method comprising the network remotely determining whether user equipment has been cloned.

19. The method of claim 15 wherein the cryptographic chip is programmed to support remote attestation, the method comprising the network remotely determining whether user equipment hardware and/or software have been altered.

20. The method of claim 11 comprising building a cryptographic chip into the platform, wherein the cryptographic chip is programmed to keep the certification message in the cryptographically secure vault.

21. The method of claim 20 wherein the cryptographic chip is programmed to support remote attestation, the method comprising the network remotely determining whether user equipment is authorized.

22. The method of claim 20 wherein the cryptographic chip is programmed to support remote attestation, the method comprising the network remotely determining whether user equipment has been cloned.

23. The method of claim 20 wherein the cryptographic chip is a Trusted Platform Module (TPM) and wherein the TPM is programmed to support remote attestation, the method comprising the network remotely determining whether user equipment hardware and/or software has been altered.

24. The method of claim 11 wherein the cryptographically secure vault is a Trusted Platform Module (TPM).

25. A method for determining whether user equipment is authorized, wherein the user is a user of a platform in a network, the method comprising:
providing a private overlay to an authorized user, the private overlay comprising a system for distributing certified public keys in a public key crypto system;
providing a platform to the authorized user, the platform:
comprising a cryptographic chip,
operating in a private mode,
having a private encryption key, and
comprised in authorized user equipment;
the system for distributing certified public keys providing the network and each authorized user with a public encryption key for the network and for each authorized user,
wherein:
the private overlay does not create a location and usage record tied to the authorized user,
the network is unable to associate location data for the platform with a specific user when the platform operates in the private mode; and
the network performing private registration, the private registration comprising:
the network periodically transmitting an identical certification message to each authorized user,
the network encrypting the certification message that is transmitted to each authorized user using that user's public encryption key,
the platform storing the certification message in a cryptographically secure vault such that the certification message cannot be accessed by an authorized user; and
the network remotely determining whether the user equipment is authorized,
wherein:
the cryptographic chip is programmed to keep the certification message in the cryptographically secure vault, and
the cryptographic chip is programmed to support remote attestation,
wherein:
the platform operating in the private mode enters the private mode by:
appending a random tag to the certification message,
signing the certification message having the appended random tag using the platform's private key,
encrypting the signed certification message having the appended random tag using the network's public key, and
transmitting the encrypted, signed certification message having the appended random tag to the network, and
the network uses the appended random tag to address the platform, to track the platform and/or to provide services to the platform.

26. The method of claim 25 wherein the cryptographically secure vault is a Trusted Platform Module (TPM).

* * * * *